US012538301B2

(12) United States Patent
Pi et al.

(10) Patent No.: US 12,538,301 B2
(45) Date of Patent: Jan. 27, 2026

(54) COMMUNICATION METHOD, USER EQUIPMENT, AND NETWORK DEVICE

(71) Applicant: DATANG MOBILE COMMUNICATIONS EQUIPMENT CO., LTD., Beijing (CN)

(72) Inventors: Qiping Pi, Beijing (CN); Xuejuan Gao, Beijing (CN); Yanping Xing, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 407 days.

(21) Appl. No.: 18/020,265

(22) PCT Filed: Jul. 19, 2021

(86) PCT No.: PCT/CN2021/107203
§ 371 (c)(1),
(2) Date: Feb. 8, 2023

(87) PCT Pub. No.: WO2022/033274
PCT Pub. Date: Feb. 17, 2022

(65) Prior Publication Data
US 2023/0276436 A1 Aug. 31, 2023

(30) Foreign Application Priority Data
Aug. 10, 2020 (CN) .......................... 202010798021.8

(51) Int. Cl.
*H04W 72/1268* (2023.01)
*H04L 1/00* (2006.01)
(Continued)

(52) U.S. Cl.
CPC ....... *H04W 72/1268* (2013.01); *H04L 1/0003* (2013.01); *H04W 56/0045* (2013.01); *H04W 72/23* (2023.01); *H04W 74/0833* (2013.01)

(58) Field of Classification Search
CPC ............. H04W 72/1268; H04W 72/23; H04W 56/0045; H04W 74/0833; H04L 1/0003
See application file for complete search history.

(56) References Cited

U.S. PATENT DOCUMENTS

2011/0103247 A1* 5/2011 Chen ..................... H04B 7/0452
370/252
2017/0187494 A1* 6/2017 Tirronen ............... H04L 1/1887
(Continued)

FOREIGN PATENT DOCUMENTS

CA 3088708 A1 7/2019
CN 108631920 A 10/2018
(Continued)

OTHER PUBLICATIONS

First Office Action for Chinese Patent Application No. 202010798021.8 issued by the Chinese Patent Office on Jun. 9, 2023, and its English Translation provided by Google Translate.
(Continued)

Primary Examiner — Jael M Ulysse
(74) Attorney, Agent, or Firm — Ladas & Parry, LLP

(57) ABSTRACT

Embodiments of the present disclosure relate to the field of wireless communication technologies, and a communication method, a user equipment, a network device, and a computer storage medium are disclosed. The communication method includes: determining a number of repetitions of a physical uplink shared channel (PUSCH), wherein the PUSCH is a PUSCH of Msg3 in a random access procedure and the number of repetitions is a positive integer; and then transmitting the PUSCH to the network device with the number of repetitions. By using the communication method pro- (Continued)

vided by an embodiment of the present disclosure, the user equipment may determine a number of repetitions for a Msg3 PUSCH (a PUSCH of Msg3), thus providing a solution for supporting the repetitions of Msg3 PUSCH and solving a critical technical problem of uplink coverage enhancement, and improving the uplink coverage range of the Msg3 PUSCH greatly.

17 Claims, 3 Drawing Sheets

(51) Int. Cl.
  *H04W 56/00* (2009.01)
  *H04W 72/23* (2023.01)
  *H04W 74/0833* (2024.01)

(56) References Cited

U.S. PATENT DOCUMENTS

| | | | |
|---|---|---|---|
| 2018/0083752 A1* | 3/2018 | Kim | H04L 5/001 |
| 2019/0215872 A1 | 7/2019 | Park et al. | |
| 2020/0205052 A1 | 6/2020 | Su et al. | |
| 2021/0058823 A1 | 2/2021 | Liu et al. | |
| 2021/0160879 A1* | 5/2021 | Lin | H04W 72/0453 |
| 2021/0251016 A1* | 8/2021 | Xiong | H04L 1/1858 |
| 2021/0352712 A1* | 11/2021 | Ly | H04W 72/1268 |
| 2021/0410192 A1* | 12/2021 | Ly | H04W 72/23 |
| 2022/0006575 A1* | 1/2022 | Cozzo | H04L 1/0073 |
| 2022/0377766 A1* | 11/2022 | Karaki | H04L 1/1864 |
| 2023/0053082 A1* | 2/2023 | Cozzo | H04W 72/1268 |
| 2023/0156782 A1* | 5/2023 | Li | H04L 1/08 370/329 |
| 2024/0215015 A1* | 6/2024 | Su | H04L 5/1469 |

FOREIGN PATENT DOCUMENTS

| | | |
|---|---|---|
| CN | 110062474 A | 7/2019 |
| CN | 111149411 A | 5/2020 |
| WO | 2020033785 A1 | 2/2020 |

OTHER PUBLICATIONS

Extended European Search Report and search opinion for the corresponding European Patent Application No. 21855327.9 issued by the European Patent Office on Dec. 18, 2023.
Second Chinese Office Action for the corresponding Chinese Patent Application No. 202010798021.8 issued by the Chinese Patent Office on Dec. 27, 2023.
"Feature lead summary of Maintenance for Early data transmission in eMTC," 3GPP TSG RAN WG1 Meeting #94, R1-1809565, Gothenburg, Swedem, Aug. 20-24, 2018, Agenda Item: 6.1.4.2, Source: Huawei, HiSilicon.
"3GPP TS 36.213 V16.2.0 (Jun. 2020)", 3GPP Draft; 36213-G20, 3rd Generation Partnership Project (3GPP), Mobile Competence Centre ; 650, Route Des Lucioles ; F-06921 Sophia-Antipolis Cedex; France Jul. 9, 2020 (Jul. 9, 2020), XP051908106, Retrieved from the Internet: URL:https://ftp.3gpp.org/tsg_ran/WG1_RL1/DRAFT/Clean_versions/36213-g20.zip, section 6 and section 7.
International Search Report for International Application No. PCT/CN2021/107203 issued on Oct. 20, 2021, and its English translation provided by WIPO.
Written Opinion for International Application No. PCT/CN2021/107203 issued on Oct. 20, 2021, and its English translation provided by Google Translate.
"Early data transmission for MTC," 3GPP TSG-RAN WG1 Meeting #90bis, R1-1716996, Prague, Czech Republic, Oct. 9-13, 2017, Source: Ericsson, Agenda Item: 6.2.5.2, all pages.
Office action from corresponding European Patent Application No. 21855327.9 dated Jul. 2, 2025.

* cited by examiner

COMMUNICATION METHOD, USER EQUIPMENT, AND NETWORK DEVICE

CROSS-REFERENCE TO RELATED APPLICATIONS

The present disclosure is the US national phase of PCT application No. PCT/CN2021/107203 filed on Jul. 19, 2021, which claims priority to Chinese Patent Application No. 202010798021.8 filed on Aug. 10, 2020, the disclosures of which are incorporated herein by reference in their entireties.

TECHNICAL FIELD

Embodiments of the present disclosure relate to the field of wireless communication technologies, and in particular, the present disclosure relates to a communication method, a user equipment, a network device and a computer readable storage medium.

BACKGROUND

In 5G new radio (NR), research needs to be conducted on coverage enhancement (CE). As can be seen from some existing evaluation results, the uplink data channel is one of the bottlenecks of system coverage restrictions and repetitions have been proved to be an important means for improving the coverage. Currently, two modes of repetitions, including PUSCH repetition type A and PUSCH repetition type B, are supported in NR. The two modes of repetitions may be used to the PUSCH scheduled by downlink control information (DCI) format 0_1/0_2 or the type1/type2 PUSCH scheduling-free. However, the Msg3 PUSCH (PUSCH of Msg3) scheduled by the random access response (RAR) may not perform the repetitions in any of the modes. Since the enhancement of the uplink coverage also includes the enhancement of the Msg3 PUSCH coverage, the repetitions being supported by Msg3 PUSCH would be an important technical for uplink coverage enhancement.

SUMMARY

An objective of the embodiments of the present disclosure is intended to solve at least one of the above mentioned defects, and provides the following technical solutions.

According to an aspect, there is provided a communication method, including:
  determining a number of repetitions of a physical uplink shared channel (PUSCH), wherein the PUSCH is a PUSCH of Msg3 in a random access procedure and the number of repetitions is a positive integer; and
  transmitting the PUSCH to a network device with the number of repetitions.

According to an aspect, there is provided a communication method, including:
  receiving a PUSCH transmitted by a user equipment (UE) with a number of repetitions, wherein the PUSCH is a PUSCH of Msg3 in a random access procedure.

According to an aspect, there is provided a user equipment, including:
  a determination module configured to determine a number of repetitions of a physical uplink shared channel (PUSCH), wherein the PUSCH is a PUSCH of Msg3 in a random access procedure and the number of repetitions is a positive integer; and
  a transmission module configured to transmit the PUSCH to a network device with the number of repetitions.

According to an aspect, there is provided a network device, including:
  a reception module configured to receive a PUSCH transmitted by a user equipment (UE) with a number of repetitions, wherein the PUSCH is a PUSCH of Msg3 in a random access procedure.

According to an aspect, there is provided a user equipment, including a memory, a processor and computer programs which are stored on the memory and executable on the processor, the programs, when executed by the processor, implement the communication method at the user equipment side.

According to an aspect, there is provided a network device, including a memory, a processor and computer programs which are stored on the memory and executable on the processor, the programs, when executed by the processor, implement the communication method at network device side.

According to an aspect, there is provided a computer readable storage medium having computer programs stored thereon, wherein the programs, when executed by a processor, implement the forgoing communication method.

Additional aspects and advantages of embodiments of the present disclosure will be set forth in part in the description which follows, and will be apparent from the description, or may be learned by practice of the present disclosure.

BRIEF DESCRIPTION OF DRAWINGS

The above and/or additional aspects and advantages of embodiments of the present disclosure will become apparent and more readily appreciated from the following description of the embodiments, taken in conjunction with the accompanying drawings in which.

DETAILED DESCRIPTION

Figure 1:
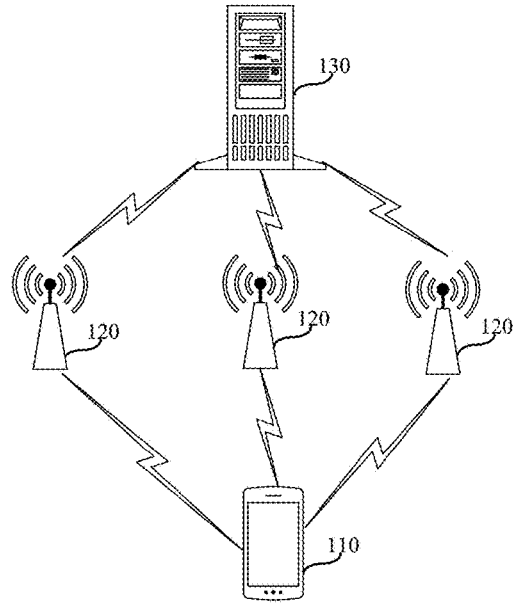
FIG. 1 is a structural schematic diagram of a wireless communication system of an embodiment of the present disclosure.

Embodiments of the present disclosure are described in detail hereinafter. The embodiments of the present disclosure are illustrated in the drawings; wherein identical or similar reference numbers indicate identical or similar elements or elements having identical or similar functions throughout. The embodiments described hereinafter with reference to the drawings are illustrative, merely used for explaining the present disclosure and should not be regarded as any limitations thereto.

It may be understood by a person of ordinary skill in the art that singular forms "a", "an", "the" and "this" as used herein may include plural forms as well, unless otherwise stated. It will be further understood that the phrase "include/including" or "comprise/comprising", when used in the description of the present disclosure, specify the presence of stated features, integers, steps, operations, elements, and/or components and do not preclude the presence or addition of one or more other features, integers, steps, operations, elements, components, and/or groups thereof. The phrase "and/or" as used herein includes all or any one of one or more associated listed items as well as all combinations thereof.

In embodiments of the present disclosure, the term "and/or" describe the association relationships between associated objects, indicating that there may exist three relationships. For example, A and/or B may indicate three cases including A exists alone, A and B exist simultaneously, and B exists alone. The character "/" generally indicates that the relationship "or" exists between the associated objects. In embodiments of the present disclosure, the term "plurality" means two or more and other words representing numbers are similar.

In the 5G NR system, there exists high requirements on coverage, where the repetitions is one of the important technologies for coverage enhancement. However, in the prior art, the Msg3 PUSCH may not perform the repetitions. The main issue for supporting Msg3 PUSCH (physical uplink shared channel) repetitions in the prior art lies in that the number of repetitions may be not indicated by RAR, and a user equipment (UE) may not obtain RRC signaling related to the number of repetitions of PUSCH before the connected status is established. Accordingly, designs are needed regarding how the UE determines the number of repetitions of the Msg3 PUSCH, how the base station know whether multiple repetitions are needed to be received and incorporated for the received Msg3 PUSCH. One of problems to be solved by embodiments of the present disclosure is determination of the number of repetitions of the Msg3 PUSCH.

In order to make the objectives, technical solutions, and advantages of embodiments of the present disclosure clearer, the technical solutions in embodiments of the present disclosure are described clearly and completely below with reference to the accompanying drawings in embodiments of the present disclosure. Obviously, the described embodiments are merely some embodiments of the present disclosure and are not all embodiments. According to the embodiments in present disclosure, all other embodiments derived by persons of ordinary skills in the art without creative efforts fall within the protection scope of present disclosure.

The technical solutions provided by the embodiments of the present disclosure may be applicable to a variety of systems, especially the 5G system. For example, the systems to which the technical solutions may be applied to may be the global system of mobile communication (GSM), the code division multiple access (CDMA) system, the wide-band code division multiple access (WCDMA) general packet radio service (GPRS) system, the long term evolution (LTE) system, the LTE frequency division duplex (FDD) system, the LTE time division duplex (TDD) system, the long term evolution advanced (LTE-A) system, the universal mobile telecommunication system (UMTS), worldwide interoperability for microwave access (WiMAX) system, and 5G new radio (NR) system etc. Each of these systems includes a user equipment and a network device. The system may further includes a part corresponding to the core network, e.g., the evolved packet system (EPS) and the 5G system (5GS) etc.

FIG. 1 is a structural schematic diagram exemplarily illustrating a wireless communication system. As shown in FIG. 1, the wireless communication system may include several user equipments 110 and several network devices 120.

A user equipment 110 may communicate with one or more core networks via radio access network (RAN). The user equipment 110 may refer to a device for providing a user with voice and/or data connectivity, a wireless connectivity enabled hand-held device, or other processing devices connected to wireless modems. The names for the user equipment may vary in different systems. For example, in the 5G system, the user equipment may be referred to as wireless user equipment (UE). The wireless user equipment may communicate with one or more of core networks (CN) via radio access network (RAN). The wireless user equipment may be a mobile user equipment such as mobile phone (or referred to as "cellphone") and a computer having a mobile user equipment, which may be a portable mobile device, a mini mobile device, a mobile device built in a computer or a vehicle-mounted mobile device and may exchange voice and/or data with the wireless access network. For example, the wireless user equipment may be a device such as a personal communication service (PCS) phone, a cordless phone, a session initiated protocol (SIP) phone, a wireless local loop (WLL) station, or a personal digital assistant (PDA) and the like. The wireless user equipment may also be referred to as system, subscriber unit, subscriber station, mobile station, mobile, remote station, access point, remote terminal, access terminal, user terminal, user agent, or user device, which is not limited in the embodiments of the present disclosure.

The network device 120 may be a base station which may include a plurality of cells providing terminals with services. Depending on different specific application scenarios, the base station may be referred to as access point, or a device which may communicate with a wireless user equipment through one or more sectors over the air interface in the access network, or other names. As a router between the wireless user equipment and remaining parts of the access network, the network device may be used to interchange the received air frames and the internet protocol (IP) packets, where the remaining parts of the access network may include a IP communication network. The network device may also perform coordination of the attribute management on the air interface. For example, the network device involved in the embodiments of the present disclosure may be a network device (base transceiver station, BTS) in a global system for mobile communications (GSM) or code division multiple access (CDMA), may also be a network device (NodeB) in wide-band code division multiple access (WCDMA), and may also be an evolved network device (evolutional Node B, eNB or e-NodeB) in a long term evolution (LTE) system or a 5G base station (gNB) in the 5G network architecture (next generation system), and may also be a home evolved node B (HeNB), a relay node, a femto, a pico and the like, which are not limited in the embodiments of the present disclosure. In some network structures, the network device may include a centralized unit (CU) node and a distributed unit (DU) node which may be arranged to be geographically separated.

The network device 120 and the user equipment 110 may each use one or more antennas for multi input multi output (MIMO) transmission therebetween. The MIMO transmission may be a single user MIMO (SU-MIMO) or a multiple user MIMO (MU-MIMO). Depending on the shape and number of the antenna combination, the MIMO transmission may be a 2D-MIMO, 3D-MIMO, FD-MIMO or massive-MIMO, and may also be a diversity transmission or precoded transmission or beamforming transmission and the like.

Moreover, the above wireless communication system may also include a network management device 130. Several network devices 120 are connected with the network management device 130 respectively. The network management device 130 may be a core network device in the wireless communication system. The network management device 130 may be a mobility management entity (MME) in an evolved packet core (EPC) network. Of course, the network management device may also be other core network devices, which is not limited in the embodiments of the present disclosure.

Figure 2:
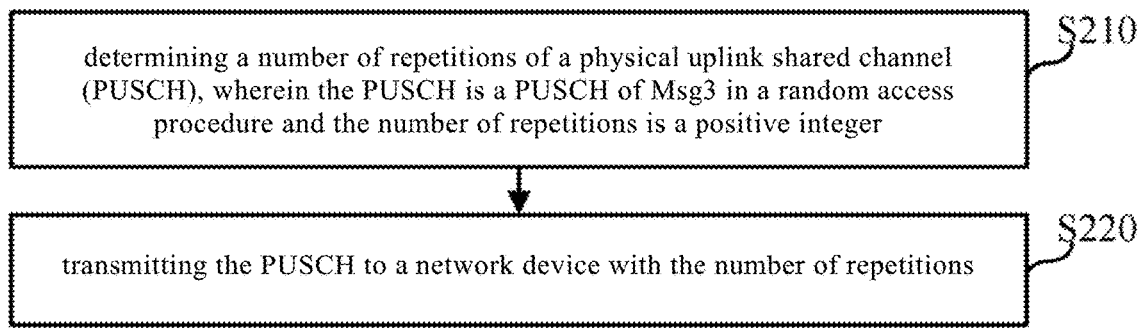
FIG. 2 is a schematic flowchart of a communication method of an embodiment according to the present disclosure.

In an embodiment of the present disclosure, there is provided a communication method which may be applied to the wireless communication system as shown in FIG. 1 and be executed by the user equipment 110 in FIG. 1. As shown in FIG. 2, the method includes:

step S210, determining a number of repetitions of a physical uplink shared channel (PUSCH), wherein the PUSCH is a PUSCH of Msg3 in a random access procedure and the number of repetitions is a positive integer; and step S220, transmitting the PUSCH to the network device with the number of repetitions.

The PUSCH of Msg3 in the random access procedure refers to Msg3 PUSCH, and Msg3 PUSCH below refers to the PUSCH of Msg3. In the description, the Msg3 PUSCH and the PUSCH of Msg3 may be used interchangeably, and they represent the same meanings, unless otherwise stated.

By using the communication method provided by the embodiment of the present disclosure, the user equipment may determine the number of repetitions of the Msg3 PUSCH (the PUSCH of Msg3), thus providing a solution for supporting the repetitions of Msg3 PUSCH and solving a critical technical problem of uplink coverage enhancement, and improving the uplink coverage range of the Msg3 PUSCH greatly.

In one possible implementation, the determining the number of repetitions of the PUSCH includes:
determining a first number of repetitions for first transmission of the PUSCH; and/or
determining a second number of repetitions for retransmission of the PUSCH;
wherein the transmitting the PUSCH to the network device with the number of repetitions includes:
transmitting the PUSCH of the first transmission to the network device with the first number of repetitions; and/or
transmitting the PUSCH of the retransmission to the network device with the second number of repetitions.

In one possible implementation, the determining the first number of repetitions for the first transmission of the PUSCH includes any one of the following:
determining, based on first indication information in a predetermined indication field in a received random access response (RAR), the first number of repetitions for the first transmission of the PUSCH;
determining, based on a downlink measurement result and a mapping relationship between the downlink measurement result and the number of repetitions, the first number of repetitions for the first transmission of the PUSCH; and
determining, based on predetermined information in transmitted physical random access channel (PRACH) and a mapping relationship between the predetermined information and the number of repetitions, the first number of repetitions for the first transmission of the PUSCH, wherein the predetermined information includes a set to which PRACH resources belong and a set to which a preamble format belongs.

In one possible implementation, the predetermined indication field in the RAR includes any one of the following:
a modulation and coding scheme (MCS) indication field;
a timing advance (TA) indication field; an idle bit field; or a newly added indication field for the number of repetitions.

In one possible implementation, when the predetermined indication field includes the MCS indication field, the first indication information is index information of the MCS; wherein the determining, based on the first indication information in the predetermined indication field in the RAR, the first number of repetitions for the first transmission of the PUSCH includes: determining, based on the index information of the MCS and a mapping relationship between the index information of the MCS and the number of repetitions, the first number of repetitions for the first transmission of the PUSCH; wherein the mapping relationship between the index information of the MCS and the number of repetitions is a mapping relationship which is defined in advance or received and indicated by the network device via broadcast.

When the predetermined indication field includes the TA indication field, the first indication information is a TA value; wherein the determining, based on the first indication information in the predetermined indication field in the RAR, the first number of repetitions for the first transmission of the PUSCH includes: determining, based on the TA value and a mapping relationship between the TA value and the number of repetitions, the first number of repetitions for the first transmission of the PUSCH; wherein the mapping relationship between the TA value and the number of repetitions is a mapping relationship which is defined in advance or received and indicated by the network device via broadcast.

When the predetermined indication field includes the idle bit field, the first indication information is indication information indicating whether the repetitions are enabled for the PUSCH of Msg3 or not; wherein the determining, based on the first indication information in the predetermined indication field in the RAR, the first number of repetitions for the first transmission of the PUSCH includes: determining, based on the indication information indicating whether the repetitions are enabled for the PUSCH of Msg3 or not, the first number of repetitions for the first transmission of the PUSCH; wherein if the idle bit field indicates that the repetitions are enabled for the PUSCH of Msg3, the first number of repetitions for the first transmission of the PUSCH is a number of repetitions which is defined in advance or received and indicated by the network device via broadcast; and if the idle bit field indicates that the repetitions are not enabled for the PUSCH of Msg3, the first number of repetitions for the first transmission of the PUSCH is 1.

When the predetermined indication field includes the newly added indication field for the number of repetitions, the first indication information is index information for indicating any one of a set of numeric values representing the number of repetitions; wherein the determining, based on the first indication information in the predetermined indication field in the RAR, the first number of repetitions for the first transmission of the PUSCH includes: determining, based on the index information for indicating any one of the set of numeric values representing the number of repetitions, the first number of repetitions for the first transmission of the PUSCH; wherein the set of numeric values representing the number of repetitions is a set of numeric values which is defined in advance or received and indicated by the network device via broadcast.

In one possible implementation, the determining the second number of repetitions for the retransmission of the PUSCH includes any one of the following:

determining, based on second indication information in the predetermined indication field in a predetermined format in downlink control information (DCI) and a mapping relationship between the second indication information and the number of repetitions, the second number of repetitions for the retransmission of the PUSCH; and determining, based on the first number of repetitions for the first transmission of the PUSCH, the second number of repetitions for the retransmission of the PUSCH.

In one possible implementation, before the transmitting the PUSCH to the network device with the number of repetitions, the method further includes:

obtaining a preset repetition type of the PUSCH, or receiving a repetition type of the PUSCH which is indicated by the network device via broadcast; and determining, based on the repetition type of the PUSCH, time domain resources for the repetitions of the PUSCH;

wherein the transmitting the PUSCH to the network device with the number of repetitions includes:

transmitting, according to the time domain resources of the PUSCH, the PUSCH to the network device with the number of repetitions.

In one possible implementation, before the determining, based on the repetition type of the PUSCH, the time domain resources for the repetitions of the PUSCH, the method further includes:

determining first initial time domain resources for the first transmission of the PUSCH indicated by the RAR, or determining second initial time domain resources for the retransmission of the PUSCH indicated by a predetermined format of the DCI;

wherein the determining, based on the repetition type of the PUSCH, the time domain resources for the repetitions of the PUSCH including:

determining, according to the repetition type of the PUSCH, the first initial time domain resources and the first number of repetitions for the first transmission of the PUSCH, the time domain resources for the first transmission of the PUSCH with the first number of repetitions; or, determining, according to the repetition type of the PUSCH, the second initial time domain resources and the second number of repetitions for the retransmission of the PUSCH, the time domain resources for the retransmission of the PUSCH with the second number of repetitions;

wherein the transmitting, according to the time domain resources of the PUSCH, the PUSCH to the network device with the number of repetitions including:

transmitting, according to the time domain resources for the first transmission of the PUSCH with the first number of repetitions, the PUSCH of the first transmission to the network device with the first number of repetitions; or, transmitting, according to the time domain resources for the retransmission of the PUSCH with the second number of repetitions, the PUSCH of the retransmission to the network device with the second number of repetitions.

In one possible implementation, the user equipment (UE) is a UE of a first type or a UE of a second type; wherein, when the UE is a UE of the first type, the first number of repetitions for the first transmission of the PUSCH is directly determined to be 1 and the time domain resources of the PUSCH are the first initial time domain resources;

when the UE is a UE of the first type, the second number of repetitions for the retransmission of the PUSCH is directly determined to be 1 and the time domain resources of the PUSCH are the second initial time domain resources;

when the UE is a UE of the second type, the first number of repetitions for the first transmission of the PUSCH is an integer number not less than 1, and the time domain resources of the PUSCH are determined according to the repetition type of the PUSCH, the first initial time domain resources and the first number of repetitions for the first transmission of the PUSCH; and when the UE is a UE of the second type, the second number of repetitions for the retransmission of the PUSCH is an integer number not less than 1, and the time domain resources of the PUSCH are determined according to the repetition type of the PUSCH, the second initial time domain resources and the second number of repetitions for the retransmission of the PUSCH.

Hereinafter, specific illustrations regarding the forgoing communication method will be given by specific examples.

The transmitting by the UE the Msg3 PUSCH to the network device includes performing first transmission of the Msg3 PUSCH and/or retransmission of the Msg3 PUSCH to the network device, wherein the first transmission of the Msg3 PUSCH to the network device means that transmitting the Msg3 PUSCH to the network device for the first time, and the retransmission of the Msg3 PUSCH to the network device means that transmitting the Msg3 PUSCH to the network device again after unsuccessful first transmission. When performing the first transmission of the Msg3 PUSCH to the network device, the UE may transmit the Msg3 PUSCH to the network device with a certain number of repetitions (e.g., a first number of repetitions). Similarly, when performing the retransmission of the Msg3 PUSCH to the network device, the UE may transmit the Msg3 PUSCH to the network device with a certain number of repetitions (e.g., a second number of repetitions). The first number of repetitions and the second number of repetitions may be the same or different, which are not limited in the embodiments of the present disclosure.

In view of this, before transmitting the Msg3 PUSCH to the network device, the user equipment may determine the number of repetitions of the Msg3 PUSCH firstly, e.g., determine the first number of repetitions for the first transmission of the Msg3 PUSCH or e.g., determine the second number of repetitions for the retransmission of the Msg3 PUSCH. The transmitting by the UE the Msg3 PUSCH to the network device with the number of repetitions includes: transmitting the Msg3 PUSCH of the first transmission to the network device with the first number of repetitions;

and/or, transmitting the Msg3 PUSCH of the retransmission to the network device with the second number of repetitions.

Before transmitting the Msg3 PUSCH to the network device with the number of repetitions, UE may determine time domain resources for the repetitions of the Msg3 PUSCH. After determining the time domain resources for the repetitions of the Msg3 PUSCH, the Msg3 PUSCH may be transmitted to the network device with the number of repetitions according to the determined time domain resources for the repetitions of the Msg3 PUSCH. During the procedure of determining the time domain resources for the repetitions of the Msg3 PUSCH, the UE may obtain a preset repetition type of the PUSCH or receive the repetition type of the PUSCH indicated by the network device via broadcast, and determine the time domain resources for the repetitions of the Msg3 PUSCH based on the repetition type of the PUSCH.

Before determining the time domain resources for the repetitions of the Msg3 PUSCH based on the repetition type of the PUSCH, the UE may firstly determine the first initial time domain resources for the first transmission of the Msg3 PUSCH indicated by the RAR or determine the second initial time domain resources for the retransmission of the Msg3 PUSCH indicated by the predetermined format (e.g., the DCI 0_0) of the DCI. Next, during the procedure of determining the time domain resources for the repetitions of the Msg3 PUSCH based on the repetition type of the PUSCH, the time domain resources of the Msg3 PUSCH for the first transmission of the Msg3 PUSCH with the first number of repetitions may be determined according to the repetition type of the PUSCH, the first initial time domain resources and the first number of repetitions for the first transmission of the Msg3 PUSCH; or, the time domain resources for retransmission of the Msg3 PUSCH with the second number of repetitions may be determined according to the repetition type of the PUSCH, the second initial time domain resources and the second number of repetitions for retransmission of the Msg3 PUSCH.

When transmitting the Msg3 PUSCH to the network device with the number of repetitions according to the time domain resources of the PUSCH, the Msg3 PUSCH of the first transmission with the first number of repetitions may be transmitted to the network device according to the time domain resources for the first transmission of the Msg3 PUSCH with the first number of repetitions; or, the Msg3 PUSCH of the retransmission with the second number of repetitions may be transmitted to the network device according to the time domain resources for the retransmission of the Msg3 PUSCH with the second number of repetitions.

In general, the UE includes a UE of the first type, e.g., the legacy UE, and a UE of the second type, e.g., the coverage enhancement (CE) UE. When the UE is a UE of the first type, the first number of repetitions for the first transmission of the Msg3 PUSCH may be directly determined to be 1, and the time domain resources of the PUSCH are the first initial time domain resources; when the UE is a UE of the first type, the second number of repetitions for the retransmission of the Msg3 PUSCH may be determined to be 1, and the time domain resources of the PUSCH are the second initial time domain resources; when the UE is a UE of the second type, the first number of repetitions for the first transmission of the Msg3 PUSCH is an integer number not less than 1, and the time domain resources of the PUSCH are determined according to the repetition type of the PUSCH, the first initial time domain resources and the first number of repetitions for the first transmission of the Msg3 PUSCH; and when the UE is a UE of the second type, the second number of repetitions for the retransmission of the Msg3 PUSCH is an integer number not less than 1, and the time domain resources of the PUSCH are determined according to the repetition type of the PUSCH, the second initial time domain resources and the second number of repetitions for retransmission of the PUSCH.

In practical application, the network device may be a base station or other network side device, which are not limited in the embodiments of the present disclosure. Specific illustrations will be made by taking an example where the network device is a base station herein. Hereinafter, specific illustrations regarding the communication method at UE side according to embodiments of the present disclosure will be given by specific schemes.

The UE may determine the number of repetitions (i.e., the first number of repetitions) for first transmission of the Msg3 PUSCH according to the following schemes, determine the time domain resources for these repetitions based on the repetition type of the PUSCH which is defined in advance or notified to the UE by the base station via broadcast, and perform the first transmission of the Msg3 PUSCH on these time domain resources, the schemes for determining the number of repetitions are as follows:

Scheme A: the number of repetitions (denoted as the first number of repetitions) for the first transmission of the Msg3 PUSCH is determined based on indication information (denoted as the first indication information) of the predetermined indication field in the RAR, wherein the predetermined indication field may be a modulation and coding scheme (MCS) in the RAR, a timing advance (TA) indication field in the RAR, an idle bit field, or a newly added indication field for the number of repetitions.

Scheme A.1: the first number of repetitions for the first transmission of the Msg3 PUSCH is determined based on the MCS indication field or TA indication field in the RAR, and the mapping relationship between the MCS or TA and the number of repetitions is defined in advance or notified to the UE by the base station via broadcast.

In one case, when the predetermined indication field includes the MCS indication field, the first indication information is index information of the MCS; wherein the determining, based on the first indication information in the predetermined indication field in the RAR, the first number of repetitions for the first transmission of the Msg3 PUSCH includes: determining, based on the index information of the MCS and the mapping relationship between the index information of the MCS and the number of repetitions, the first number of repetitions for the first transmission of the Msg3 PUSCH; wherein the mapping relationship between the index information of the MCS and the number of repetitions is a mapping relationship which is defined in advance or received and indicated by the network device (i.e., the base station) via broadcast.

In another case, when the predetermined indication field includes the TA indication field, the first indication information is a TA value; wherein the determining, based on the first indication information in the predetermined indication field in the RAR, the first number of repetitions for the first transmission of the Msg3 PUSCH includes: determining, based on the TA value and the mapping relationship between the TA value and the number of repetitions, the first number of repetitions for the first transmission of the Msg3 PUSCH; wherein the mapping relationship between the TA value and the number of repetitions is a mapping relationship which is defined in advance or received and indicated by the network device (i.e., the base station) via broadcast.

Scheme A.2: the first number of repetitions for the first transmission of the Msg3 PUSCH is determined based on the idle bit field in the RAR, and the indication information in the idle bit field indicates whether the repetitions are enabled for the Msg3 PUSCH or not; and if the repetitions are enabled, the number of repetitions is defined in advance or notified to the UE by the base station via broadcast.

In other words, when the predetermined indication field includes the idle bit field, the first indication information is indication information indicating whether the repetitions are enabled for the PUSCH of Msg3 or not; wherein the determining, based on the first indication information in the predetermined indication field in the RAR, the first number of repetitions for the first transmission of the Msg3 PUSCH includes: determining, based on the indication information indicating whether the repetitions are enabled for the Msg3 PUSCH or not, the first number of repetitions for the first transmission of the Msg3 PUSCH; wherein if the idle bit field indicates that the repetitions are enabled for the Msg3 PUSCH, the first number of repetitions for the first transmission of the Msg3 PUSCH is a number of repetitions which is defined in advance or received and indicated by the network device via broadcast; and if the idle bit field indicates that the repetitions are not enabled for the Msg3 PUSCH, the first number of repetitions for the first transmission of the Msg3 PUSCH is 1.

Scheme A.3: the first number of repetitions for the first transmission of the Msg3 PUSCH is determined based on the newly added indication field for the number of repetitions, and, the indication field indicates a value from among a set of values as the number of repetitions, the set of values is defined in advance or notified to the UE by the base station via broadcast.

In other words, when the predetermined indication field includes the newly added indication field for the number of repetitions, the first indication information is index information indicating any one of a set of numeric values representing the number of repetitions; wherein the determining, based on first indication information in the predetermined indication field in the RAR, the first number of repetitions for the first transmission of the Msg3 PUSCH includes: determining, based on the index information for indicating any one of the set of numeric values representing the number of repetitions, the first number of repetitions for the first transmission of the Msg3 PUSCH; wherein the set of numeric values representing the number of repetitions is a set of numeric values which is defined in advance or received and indicated by the network device via broadcast.

Scheme B: the first number of repetitions for the first transmission of the Msg3 PUSCH is determined based on the measurement result. That is, the first number of repetitions for the first transmission of the Msg3 PUSCH is determined according to the measurement result of reference signal receiving power (RSRP) of synchronization signal block (SSB) by UE, and the mapping relationship between the measurement result of RSRP of SSB and the number of repetitions is defined in advance or notified to the UE by the base station via broadcast information. That is, the first number of repetitions for the first transmission of the Msg3 PUSCH is determined based on the downlink measurement result and the mapping relationship between the downlink measurement result and the number of repetitions.

Scheme C: the first number of repetitions for the first transmission of the Msg3 PUSCH is determined based on the related information transmitted by the physical random access channel (PRACH); in particular, the first number of repetitions for the first transmission of the Msg3 PUSCH is determined according to a set to which PRACH resources transmitted by the UE belong to and a set to which a preamble format belongs; wherein the mapping relationship between the set to which the PRACH resources belong to or the set to which the preamble format belongs to and the number of repetitions is defined in advance or notified to the UE by the base station via broadcast information. That is, the UE determines the first number of repetitions for the first transmission of the Msg3 PUSCH based on the predetermined information in the transmitted physical random access channel (PRACH) and the mapping relationship between the predetermined information and the number of repetitions, wherein the predetermined information includes the set to which the PRACH resources belong and the set to which the preamble format belongs.

The above schemes may be selected by the UE autonomously, or a scheme may be predefined by protocol or the UE is notified which scheme to use by the base station via the broadcast; and the foregoing first number of repetitions is a positive integer.

The UE determines the number of repetitions for the retransmission of the Msg3 PUSCH (i.e., the second number of repetitions) based on the following schemes, determines the time domain resources for these repetitions according to the repetition type of the PUSCH (i.e. the PUSCH repetition type) which is defined in advance or notified to the UE by the base station via broadcast, and performs the retransmission of the Msg3 PUSCH on these time domain resources, the schemes are as follows:

Scheme A: the second number of repetitions for the retransmission of the Msg3 PUSCH is determined based on the predetermined indication field in downlink control information (DCI) 0_0; in particular, the second number of repetitions for the retransmission of the Msg3 PUSCH is determined based on the indication information (i.e., the second indication information) in the predetermined indication field in the predetermined format (e.g. DCI 0_0) of the DCI and the mapping relationship between the second indication information and the number of repetitions.

Scheme B: the second number of repetitions for the retransmission of the Msg3 PUSCH is determined based on the first number of repetitions for the first transmission of the Msg3 PUSCH; in particular, the first number of repetitions for the first transmission of the Msg3 PUSCH may be determined to be the second number of repetitions for the retransmission of the Msg3 PUSCH, or the second number of repetitions may be obtained by adding a positive integer to the first number of repetitions.

The above two schemes may be selected by the UE autonomously, or a scheme may be predefined by protocol or the U'E is notified which scheme to use by the base station via the broadcast, and the foregoing second number of repetitions is a positive integer.

Figure 3:
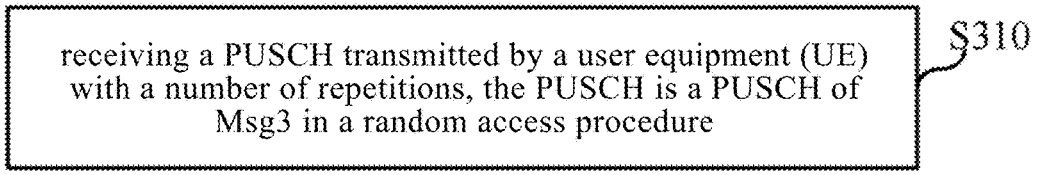
FIG. 3 is a schematic flowchart of a communication method according to another embodiment of the present disclosure.

In yet another embodiment of the present disclosure, there is provided a communication method, which is applied to the wireless communication system as show in FIG. 1 and performed by the network device 120 in FIG. 1. As shown in FIG. 3, the method includes:

Step S310, receiving a PUSCH transmitted by a user equipment (UE) with a number of repetitions, the PUSCH is a PUSCH of Msg3 in a random access procedure.

The PUSCH of Msg3 in the random access procedure refers to Msg3 PUSCH, and Msg3 PUSCH below refers to the PUSCH of Msg3. In the description, the Msg3 PUSCH and the PUSCH of Msg3 may be used interchangeably, and they represent the same meanings, unless otherwise stated.

By using the communication method provided by the embodiment of the present disclosure, the network device may receive the Msg3 PUSCH (the PUSCH of Msg3) with a number of repetitions, thus the number of repetitions of the Msg3 PUSCH may be determined, a solution for supporting the repetitions of Msg3 PUSCH is provided and a critical technical problem of uplink coverage enhancement is solved, and the uplink coverage range of the Msg3 PUSCH is greatly improved.

In one possible implementation, the receiving the PUSCH transmitted by the UE with the number of repetitions includes:
  receiving the PUSCH of first transmission transmitted by the UE with a first number of repetitions; and/or
  receiving the PUSCH of retransmission transmitted by the UE with a second number of repetitions.

In one possible implementation, before the receiving the PUSCH transmitted by the UE with the number of repetitions, the method further includes:
  obtaining a repetition type of the PUSCH which is set in advance or transmitted by the network device via broadcast, and determining, based on the repetition type of the PUSCH, time domain resources for the transmission of the PUSCH;
  wherein the receiving the PUSCH transmitted by the UE with the number of repetitions includes:
  receiving, according to the time domain resources of the PUSCH, the PUSCH transmitted by UE with the number of repetitions.

In one possible implementation, before the determining, based on the repetition type of the PUSCH, the time domain resources for the transmission of the PUSCH, the method further includes:
  determining first initial time domain resources for the first transmission of the PUSCH indicated by the RAR, or determining second initial time domain resources for the retransmission of the PUSCH indicated by the predetermined format of the DCI;
  wherein the determining, based on the repetition type of the PUSCH, the time domain resources for the transmission of the PUSCH includes:
  determining, according to the repetition type of the PUSCH and the first initial time domain resources, the time domain resources for the first transmission of the PUSCH with the first number of repetitions; or, determining, according to the repetition type of the PUSCH and the second initial time domain resources, the time domain resources for the retransmission of the PUSCH with the second number of repetitions;
  wherein the receiving, according to the time domain resources of the PUSCH, the PUSCH transmitted by UE with the number of repetitions includes:
  receiving, according to the time domain resources for the first transmission of the PUSCH with the first number of repetitions, the PUSCH of the first transmission transmitted by the UE with the first number of repetitions; or,
  receiving, according to the time domain resources for the retransmission of the PUSCH with the second number of repetitions, the PUSCH of the retransmission transmitted by the UE with the second number of repetitions.

In one possible implementation, the method is performed by the network device, the UE includes a UE of a first type or a UE of a second type, wherein when the network device may determine that the UE is a UE of the first type or a UE of the second type,
  the receiving the PUSCH of the first transmission transmitted by the UE with the first number of repetitions includes:
  for a UE of the first type, receiving the PUSCH of the first transmission for one time on the first initial time domain resources for the first transmission of the PUSCH indicated by the RAR;
  for a UE of the second type, continuously receiving, according to the repetition type of the PUSCH and the first initial time domain resources for the first transmission of the PUSCH indicated by the RAR, the PUSCH of the first transmission with the first number of repetitions, or receiving the PUSCH of the first transmission with the first number of repetitions through blind detections;
  wherein the receiving the PUSCH of the retransmission transmitted by the UE with the second number of repetitions includes:
  for a UE of the first type, receiving the PUSCH of the retransmission for one time on the second initial time domain resources for the retransmission of the PUSCH indicated by the predetermined format of the DCI; and
  for a UE of the second type, continuously receiving, according to the repetition type of the PUSCH and the second initial time domain resources for the retransmission of the PUSCH indicated by the predetermined format of the DCI, the PUSCH of the retransmission with the second number of repetitions, or receiving the PUSCH of the retransmission with the second number of repetitions through the blind detections.

In one possible implementation, for a UE of the second type, continuously receiving, according to the repetition type of the PUSCH and the first initial time domain resources for the first transmission of the PUSCH indicated by the RAR, the PUSCH of the first transmission with the first number of repetitions, or receiving the PUSCH of the first transmission with the first number of repetitions through the blind detections, includes: if the network device may determine the first number of repetitions according to any one of the following ways, continuously receiving, according to the time domain resources for the first transmission of the PUSCH with the first number of repetitions, the PUSCH of the first transmission with the first number of repetitions; wherein the time domain resources for the first transmission of the PUSCH with the first number of repetitions are determined according to the repetition type of the PUSCH, the first initial time domain resources and the first number of repetitions; wherein the ways for determining the first number of repetitions includes: first indication information in the predetermined indication field in the transmitted RAR; or predetermined information in the received PRACH, and a mapping relationship between the predetermined information and the number of repetitions, wherein the predetermined information includes a set to which PRACH resources belong and a set to which a preamble format belongs;

if the network device may not determine the first number of repetitions, receiving the PUSCH of the first transmission with the first number of repetitions by performing the blind detections on the PUSCH of the first transmission for a first predetermined number of blind detections according to the repetition type of the PUSCH and the first initial time domain resources for the first transmission of the PUSCH indicated by the RAR; wherein the first predetermined number of blind detections is an integer number greater than or equal to the first number of repetitions, and the first predetermined number of blind detections is defined in advance.

In one possible implementation, for a UE of the second type, continuously receiving, according to the repetition type of the PUSCH and the second initial time domain resources for the retransmission of the PUSCH indicated by the predetermined format of the DCI, the PUSCH of the retransmission with the second number of repetitions, or receiving the PUSCH of the retransmission with the second number of repetitions through the blind detections, includes:

if the network device may determine the second number of repetitions according to any one of the following ways, continuously receiving, according to the time domain resources for the retransmission of the PUSCH with the second number of repetitions, the PUSCH of the retransmission with the second number of repetitions; wherein the time domain resources for the retransmission of the PUSCH with the second number of repetitions are determined according to the repetition type of the PUSCH, the second initial time domain resources for the retransmission of the PUSCH indicated by the predetermined format of the DCI and the second number of repetitions; wherein the ways for determining the second number of repetitions includes: second indication information in a predetermined indication field in a predetermined format in a downlink DCI; and the first number of repetitions for the first transmission of the PUSCH;

if the network device may not determine the second number of repetitions, receiving the PUSCH of the retransmission with the second number of repetitions by performing the blind detections on the PUSCH of the retransmission for a second predetermined number of blind detections according to the repetition type of the PUSCH and the second initial time domain resources for the retransmission of the PUSCH indicated by the predetermined format of the DCI; wherein the second predetermined number of blind detections is an integer number greater than or equal to the second number of repetitions and the second predetermined number of blind detections is defined in advance.

In one possible implementation, the method is preformed by the network device, and the UE includes a UE of a first type or a UE of a second type, wherein when the network device may not determine that the UE is a UE of the first type or a UE of the second type, the receiving the PUSCH of the first transmission transmitted by the UE with the first number of repetitions includes:

for a UE of the first type or a UE of the second type, receiving through the blind detections, according to the repetition type of the PUSCH and the first initial time domain resources for the first transmission of the PUSCH indicated by the RAR, the PUSCH of the first transmission with the first number of repetitions;

wherein the receiving the PUSCH of the retransmission transmitted by the UE with the second number of repetitions includes:

for a UE of the first type or a UE of the second type, receiving through the blind detections, according to the repetition type of the PUSCH and the second initial time domain resources for the retransmission of the PUSCH indicated by the predetermined format of the DCI, the PUSCH of the retransmission with the second number of repetitions.

In one possible implementation, the receiving through the blind detections according to the repetition type of the PUSCH and the first initial time domain resources for the first transmission of the PUSCH indicated by the RAR, the PUSCH of the first transmission with the first number of repetitions includes:

if the network device may determine the first number of repetitions according to any one of the following ways, receiving the PUSCH of the first transmission with the first number of repetitions by performing the blind detections on the PUSCH of the first transmission with the first number of repetitions according to the repetition type of the PUSCH and the first initial time domain resources for the first transmission of the PUSCH indicated by the RAR, the ways for determining the first number of repetitions includes: first indication information in the predetermined indication field in the transmitted RAR; and predetermined information in the received PRACH, and a mapping relationship between the predetermined information and the number of repetitions, wherein the predetermined information includes a set to which PRACH resources belong and a set to which a preamble format belongs;

if the network device may not determine the first number of repetitions, receiving the PUSCH of the first transmission with the first number of repetitions by performing the blind detections on the PUSCH of the first transmission for a third predetermined number of blind detections according to the repetition type of the PUSCH and the first initial time domain resources for the first transmission of the PUSCH indicated by the RAR; wherein the third predetermined number of blind detections is an integer number greater than or equal to the first number of repetitions, and the third predetermined number of blind detections is defined in advance.

In one possible implementation, the receiving through the blind detections, according to the repetition type of the PUSCH and the second initial time domain resources for the retransmission of the PUSCH indicated by the predetermined format of the DCI, the PUSCH of the retransmission with the second number of repetitions includes:

if the network device may determine the second number of repetitions according to any one of the following ways, receiving the PUSCH of the retransmission with the second number of repetitions by performing the blind detections on the PUSCH of the retransmission with the second number of repetitions according to the repetition type of the PUSCH and the second initial time domain resources for the retransmission of the PUSCH indicated by the predetermined format of the DCI, the ways for determining the second number of repetitions includes: second indication information in the predetermined indication field in the predetermined format in the downlink DCI; and the first number of repetitions for the first transmission of the PUSCH;

if the network device may not determine the second number of repetitions, receiving the PUSCH of the retransmission with the second number of repetitions by performing the blind detections on the PUSCH of the retransmission for a fourth predetermined number of blind detections according to the repetition type of the PUSCH and the second initial time domain resources for the retransmission of the PUSCH indicated by the predetermined format of the DCI; wherein the fourth predetermined number of blind detections is an integer number greater than or equal to the second number of repetitions and the fourth predetermined number of blind detections is defined in advance.

In one possible implementation, whether the network device may determine the UE is a UE of the first type or a UE of the second type is determined according to the predetermined information in the PRACH transmitted by the UE;

wherein the predetermined information includes any one of: a set to which PRACH resources belong; a set to which a preamble format belongs to; and PRACH target power.

In one possible implementation, the predetermined indication field in the RAR includes any one of the following:
a modulation and coding scheme (MCS) indication field; a timing advance (TA) indication field; an idle bit field; or a newly added indication field for the number of repetitions.

Hereinafter, specific illustrations regarding the forgoing communication method will be given by specific examples.

The transmitting by the UE the Msg3 PUSCH to the network device includes performing the first transmission of the Msg3 PUSCH and/or the retransmission of the Msg3 PUSCH to the network device, and correspondingly, the network device receives the Msg3 PUSCH of the first transmission and the Msg3 PUSCH of the retransmission transmitted by the UE. When performing the first transmission of the Msg3 PUSCH to the network device, the UE may transmit the Msg3 PUSCH to the network device with a certain number of repetitions (e.g., the first number of repetitions). Similarly, when performing the retransmission of the Msg3 PUSCH to the network device, the UE may transmit the Msg3 PUSCH to the network device with a certain number of repetitions (e.g., the second number of repetitions). Correspondingly, the network device receives the Msg3 PUSCH of the first transmission transmitted by the UE with the first number of repetitions; and/or receives the Msg3 PUSCH of the retransmission transmitted by the UE with the second number of repetitions. The first number of repetitions and the second number of repetitions may be the same or different, which are not limited in embodiments of the present disclosure.

Based on this, the network device may obtain the repetition type of the PUSCH which is set in advance or transmitted by the network device via broadcast before receiving the Msg3 PUSCH transmitted by UE with the number of repetitions, and determine the time domain resources for the transmission of the Msg3 PUSCH based on the repetition type of the PUSCH. When receiving the Msg3 PUSCH transmitted by UE with the number of repetitions, the network device may receive the Msg3 PUSCH transmitted by the UE with the number of repetitions according to the time domain resources for the Msg3 PUSCH. For example, the network device may receive the Msg3 PUSCH of the first transmission transmitted by the UE with the first number of repetitions according to the time domain resources of the Msg3 PUSCH. For another example, the network device may receive the Msg3 PUSCH of the retransmission transmitted by the UE with the second number of repetitions according to the time domain resources of the Msg3 PUSCH.

Specifically, before determining the time domain resources for the transmission of the Msg3 PUSCH based on the repetition type of the PUSCH, the network device may firstly determine the first initial time domain resources for the first transmission of the Msg3 PUSCH indicated by the RAR or determine the second initial time domain resources for the retransmission of the Msg3 PUSCH indicated by the predetermined format (e.g., the DCI 0_0) of the DCI. Next, during the procedure of determining the time domain resources for the transmission of the Msg3 PUSCH based on the repetition type of the PUSCH, the network device may determine the time domain resources for the first transmission of the Msg3 PUSCH with the first number of repetitions according to the repetition type of the PUSCH and the first initial time domain resources; or determine the time domain resources for the retransmission of the Msg3 PUSCH with the second number of repetitions according to the repetition type of the PUSCH and the second initial time domain resources.

During the procedure of receiving the Msg3 PUSCH transmitted by UE with the number of repetitions according to the time domain resources of the Msg3 PUSCH, the network device may receive the Msg3 PUSCH of the first transmission transmitted by UE with the first number of repetitions according to the time domain resources for the first transmission of the Msg3 PUSCH with the first number of repetitions; or receive the Msg3 PUSCH of the retransmission transmitted by UE with the second number of repetitions according to the time domain resources for the retransmission of the Msg3 PUSCH with the second number of repetitions.

The UE may be a UE of the first type, e.g., the legacy UE, and may also be a UE of the second type, e.g., CE UE. When the network device may determine the UE is a UE of the first type or a UE of the second type, ① during the procedure of receiving the Msg3 PUSCH of the first transmission transmitted by the UE with the first number of repetitions, D for the UE of the first type, the network device receives the Msg3 PUSCH of the first transmission for one time on the first initial time domain resources for the first transmission of the Msg3 PUSCH indicated by the RAR; ② for the UE of the second type, the network device continuously receives the Msg3 PUSCH of the first transmission with the first number of repetitions according to the repetition type of the PUSCH and the first initial time domain resources for the first transmission of the Msg3 PUSCH indicated by the RAR, or receives the Msg3 PUSCH of the first transmission with the first number of repetitions through the blind detections; (2) during the procedure of receiving the Msg3 PUSCH of the retransmission transmitted by the UE with the second number of repetitions, ① for the UE of the first type, the network device receives the Msg3 PUSCH of the retransmission for one time on the second initial time domain resources for the retransmission of the Msg3 PUSCH indicated by the predetermined format of the DCI;

② for the UE of the second type, the network device continuously receives the Msg3 PUSCH of the retransmission with the second number of repetitions according to the repetition type of the PUSCH and the second initial time domain resources for the retransmission of the Msg3 PUSCH indicated by the predetermined format of the DCI, or receives the Msg3 PUSCH of the retransmission with the second initial time domain resources through the blind detection.

In practical application, the network device may be a base station or other network side device, which are not limited in the embodiments of the present disclosure. Specific illustrations will be made by taking an example where the network device is a base station herein. Hereinafter, specific illustrations regarding the communication method at the network device side according to the embodiments of the present disclosure will be given by specific schemes:

Scheme A: if the base station may identify that the UE is a legacy UE or a CE UE, i.e., the base station may determine that the UE is a UE of the first type (i.e., the legacy UE) or a UE of the second type (i.e., the CE UE), then
  the base station receives the Msg3 PUSCH of the first transmission according to the following approaches:
    the base station only receives the Msg3 PUSCH of the first transmission for one time for the legacy UE;
    the base station receives the Msg3 PUSCH of the first transmission for the CE UE, which may specifically include:
      if the UE determines the number of repetitions (i.e., the first number of repetitions) for the first transmission of the Msg3 PUSCH according to the predetermined indication field in the RAR or related information of the PRACH, the base station determines the first number of repetitions according to rules consistent with those at the UE side, determines the time domain resources for the first transmission of the Msg3 PUSCH with the first number of repetitions based on the repetition type of the PUSCH which is defined in advance or notified to the UE by the base station via broadcast, and receives the Msg3 PUSCH of the first transmission on these time domain resources;
      if the UE determines the number of repetitions (i.e., the first number of repetitions) for the first transmission of the Msg3 PUSCH based on the measurement result, the base station determines the time domain resources for the first transmission of the Msg3 PUSCH with the first number of repetitions according to a predefined first predetermined number of blind detections (e.g., a predefined number of repetitions for blind detections) and the repetition type of the PUSCH which is defined in advance or notified to the UE by the base station via broadcast, and performs the blind detections on the first transmission of the Msg3 PUSCH on these time domain resources.
    the base station receives the Msg3 PUSCH of the retransmission according to the following approaches:
      the base station only receives the Msg3 PUSCH of the retransmission for one time for the legacy UE;
      the base station receives the Msg3 PUSCH of the retransmission for the CE UE, which may specifically include:
        if the UE determines the second number of repetitions for the retransmission of the Msg3 PUSCH based on the predetermined indication field in the DCI 0_0, the base station determines the second number of repetitions according to rules consistent with those at the UE side, determines the time domain resources for the retransmission of the Msg3 PUSCH with the second number of repetitions according to the PUSCH repetition type which is defined in advance or notified to the UE by the base station via broadcast, and receives the Msg3 PUSCH of the retransmission on these time domain resources; and
        if the UE determines the second number of repetitions for the retransmission of the Msg3 PUSCH based on the first number of repetitions for the first transmission of the Msg3 PUSCH, the base station receives the Msg3 PUSCH of the retransmission according to rules consistent with those for receiving the Msg3 PUSCH of the first transmission.

Scheme B: if the base station may not identify that the UE is a legacy UE or a CE UE, then
  The base station receives the Msg3 PUSCH of the first transmission according to the following approaches:
    if the UE determines the first number of repetitions for the first transmission of the Msg3 PUSCH according to the predetermined indication field in the RAR or related information of the PRACH, the base station determines the number of repetitions for the Msg3 PUSCH according to rules consistent with those at the UE side, determines the time domain resources for the first transmission of the Msg3 PUSCH with the first number of repetitions according to the repetition type of the PUSCH which is defined in advance or notified to the UE by the base station via broadcast, and performs the blind detections on the first transmission of the Msg3 PUSCH on these time domain resources; and
    if the UE determines the first number of repetitions for the first transmission of the Msg3 PUSCH based on the measurement result, the base station determines the time domain resources for the first transmission of the Msg3 PUSCH with the first number of repetitions according to a first predetermined number of blind detections (e.g., a predefined number of repetitions for blind detections) and the repetition type of the PUSCH which is defined in advance or notified to the UE by the base station via broadcast, and performs the blind detections on the first transmission of the Msg3 PUSCH on these time domain resources.
  The base station receives the Msg3 PUSCH of the retransmission according to the following approaches:
    if the UE determines the second number of repetitions for the retransmission of the Msg3 PUSCH based on the predetermined indication field in the DCI 0_0, the base station determines the second number of repetitions according to rules consistent with those at the UE side, determines the time domain resources for the retransmission of the Msg3 PUSCH with the second number of repetitions according to the PUSCH repetition type which is defined in advance or notified to the UE by the base station via broadcast, and performs the blind detections on the retransmission of the Msg3 PUSCH on these time domain resources; and In table 1, the schemes for the UE to transmit the Msg3 PUSCH of the first transmission and the Msg3 PUSCH of the retransmission are provided at the UE side, and the schemes for the base station to receive the Msg3 PUSCH of the first transmission and the Msg3 PUSCH of the retransmission are provided at the base station side.

TABLE 1 correspondence relationship between the implementation scheme and the implementation example

| scheme number of the implementation scheme | example number (s) of the implementation example corresponding to the implementation scheme | schemes for the first transmission of the Msg3 PUSCH and the retransmission of the Msg3 PUSCH at the UE side | schemes for receiving the Msg3 PUSCH of the first transmission and the Msg3 PUSCH of the retransmission at the base station side |
|---|---|---|---|
| Scheme 1 | Examples 1 and 2 | Scheme A.1 for first transmission, and Scheme A or Scheme B for retransmission | Scheme A |
| Scheme 2 | examples 3 and 4 | Scheme A.1 for first transmission, and Scheme A or Scheme B for retransmission | Scheme B |
| Scheme 3 | Example 5 | Scheme B for first transmission, and Scheme B for retransmission | Scheme B |
| Scheme 4 | Example 6 | Scheme B for first transmission, and Scheme B for retransmission | Scheme A |
| Scheme 5 | Examples 7-1 and 7-2 | Scheme A.2 for first transmission, and Scheme B for retransmission | Scheme A or Scheme B |
| Scheme 6 | Examples 8 and 9 | Scheme A.3 for first transmission, and Scheme B for retransmission | Scheme A or Scheme B |
| Scheme 7 | Examples 10 and 11 | Scheme C for first transmission, and Scheme B for retransmission | Scheme A or Scheme B | if the UE determines the second number of repetitions for the retransmission of the Msg3 PUSCH based on the first number of repetitions for the first transmission of the Msg3 PUSCH, the base station receives the Msg3 PUSCH of the retransmission according to rules consistent with those for receiving the Msg3 PUSCH of the first transmission.

The base station may identify whether the UE is a legacy UE or a UE of the CE type (i.e., the CE UE) based on a PRACH resource set to which the PRACH transmitted by the UE belongs or a set to which the preamble format belongs to or a range of the PRACH target power; that is, whether the base station may determine the UE is a UE of the first type or a UE of the second type is determined based on the predetermined information in the PRACH transmitted by the UE, wherein the predetermined information includes any one of the following: a set to which the PRACH resources belong to; a set to which the preamble format belongs to; and the PRACH target power.

Further, the predetermined indication field in the RAR comprising any one of the following: a modulation and coding scheme (MCS) indication field; a timing advance (TA) indication field; an idle bit field; or a newly added indication field for the number of repetitions.

Hereinafter, specific illustrations regarding the forgoing communication method at the UE side and the base station side will be given in conjunction with specific possible implementation schemes and implementation examples:

For ease of description, a scheme number of a specific implementation scheme, an example number of a specific implementation example, and the correspondence relationship between the specific implementation scheme and the specific implementation example are shown in table 1 below.

Scheme 1: Scheme A.1 is adopted for the first transmission at the UE side, and Scheme A or Scheme B is adopted for the retransmission at the UE side; and Scheme A is adopted at the base station side.

The base station identifies the UE of the CE type and the legacy UE by PRACH, and the base station only perform repeated receptions for the UE of the CE type when receiving the Msg3 PUSCH. (1) The number of repetitions (i.e., the first number of repetitions) for the first transmission of the Msg3 PUSCH is implicitly by the MCS or TA in the RAR, wherein the mapping relationship between the MCS or TA and the number of repetitions is defined in advance or notified to the UE by the base station via broadcast; and (2) The number of repetitions (i.e., the second number of repetitions) for the retransmission of the Msg3 PUSCH is implicitly indicated by the MCS of the DCI 0_0 scheduling the retransmission or determined according to the number of repetitions for the first transmission of the Msg3 PUSCH. The repetition type (PUSCH repetition type A or B) of the Msg3 PUSCH is defined in advance or notified to the UE by the base station via broadcast.

At the UE side:
the legacy UE transmits the Msg3 PUSCH of the first transmission for one time according to the time domain positions (i.e., the first initial time domain resources) of the Msg3 PUSCH indicated by the RAR;
the legacy UE transmits the Msg3 PUSCH of the retransmission for one time according to the time domain positions (i.e., the second initial time domain resources) indicated by the DCI 0_0 scheduling the retransmission; and
the UE of the CE type continuously transmits the Msg3 PUSCH of the first transmission for K1 times from the time domain positions of the Msg3 PUSCH indicated by the RAR.

The number of repetitions K1 (i.e., the first number of repetitions) for the first transmission of the Msg3 PUSCH is determined according to the mapping relationship between the MCS indicated by the received RAR and the number of repetitions, or determined based on the mapping relationship between the indicated TA and the number of repetitions, and K1 is a positive integer.

The mapping relationship between the MCS and the number of repetitions or the mapping relationship between the TA and the number of repetitions is defined in advance or notified to the UE by the base station via broadcast information.

The repetition type (PUSCH repetition type A or B) of the Msg3 PUSCH is defined in advance or notified to the UE by the base station via broadcast.

The UE of the CE type continuously transmits the Msg3 PUSCH of the retransmission for K2 times from the time domain positions indicated by the DCI 0_0 scheduling the retransmission.

The number of repetitions K2 (i.e. the second number of repetitions) for the retransmission of the Msg3 PUSCH is determined according to the mapping relationship between the MCS indicated by the DCI 0_0 scheduling the retransmission and the number of repetitions, or determined according to the number of repetitions K1 for the first transmission of the Msg3 PUSCH.

If the number of repetitions K2 for the retransmission of the Msg3 PUSCH is determined according to the mapping relationship between the MCS and the number of repetitions, the mapping relationship is defined in advance or notified to the UE by the base station via broadcast information; and If the number of repetitions for the retransmission of the Msg3 PUSCH is determined according to the number of repetitions K1 for the first transmission, then K1=K2, or K2=K1+delta, wherein the delta is an integer number not less than 0 which is defined in advance or indicated by the base station via broadcast information.

The repetition type (PUSCH repetition type A or B) of the Msg3 PUSCH is defined in advance or notified to the UE by the base station via broadcast.

At the Base Station Side:

if the base station determines that the UE is a legacy UE, the base station only receives the Msg3 PUSCH of the first transmission for one time on the time domain positions of the Msg3 PUSCH indicated by the RAR, or receives the Msg3 PUSCH of the retransmission for one time on the time domain positions indicated by the DCI 0_0 scheduling the retransmission; and if the base station determines that the UE is a UE of the CE type, the base station continuously receives the Msg3 PUSCH of the first transmission for K1 times from the time domain positions of the Msg3 PUSCH indicated by the RAR, or continuously receives the Msg3 PUSCH of the retransmission for K2 times from the time domain positions indicated by the DCI 0_0 scheduling the retransmission.

K1 is determined according to the mapping relationship between the MCS indicated by the RAR and the number of repetitions, or determined according to the mapping relationship between the TA indicated by the RAR and the number of repetitions.

The mapping relationship between the MCS and the number of repetitions or the mapping relationship between the TA and the number of repetitions is defined in advance or notified to the UE by the base station via broadcast information.

K2 is determined according to the mapping relationship between the MCS indicated by the DCI 0_0 scheduling the retransmission and the number of repetitions, or determined according to the number of repetitions K1 for the first transmission of the Msg3 PUSCH.

If K2 is determined according to the mapping relationship between the MCS and the number of repetitions, the mapping relationship is defined in advance or notified to the UE by the base station via broadcast information; and If K2 is determined according to the number of repetitions K1 for the first transmission, then K1=K2, or K2=K1+delta, wherein the delta is an integer number not less than 0 which is defined in advance or indicated by the base station via broadcast information.

The rules for the base station side to determine K2 are consistent with the rules for the UE side to determine K2.

The repetition type (PUSCH repetition type A or B) of the Msg3 PUSCH is defined in advance or notified to the UE by the base station via broadcast.

In the previous two steps, the method of the base station determining the type of the UE may be:

the base station allocates the UE of the CE type and the legacy UE with different PRACH resource sets or different preamble format sets, or indicates different PRACH target power; and when receiving the PRACH, the base station determines whether the type of the UE is the UE of the CE type or the legacy UE according to the PRACH resource set to which the PRACH belongs or the set to which the preamble format belongs or the range of the received PRACH power.

Scheme 2: Scheme A.1 is adopted for the first transmission at the UE side, and Scheme A or Scheme B is adopted for the retransmission at the UE side, and Scheme B is adopted at the base station side.

The base station does not identify the UE of the CE type and the legacy UE, and when the base station receives the Msg3 PUSCH of the first transmission or retransmission, whether there are repeated receptions or not is determined through the blind detection. The range of the blind detections (i.e., the number of blind detections) is the number of repetitions implicitly determined by the MCS or TA in the RAR. The number of repetitions for the UE of the CE type to transmit the Msg3 PUSCH of the first transmission is implicitly indicated by the MCS or TA in the RAR, wherein the mapping relationship between the MCS or TA and the number of repetitions is defined in advance or notified to the UE by the base station via broadcast, and the number of repetitions for the retransmission of the Msg3 PUSCH is implicitly indicated by the MCS of DCI 0_0 scheduling the retransmission, or determined according to the number of repetitions for the first transmission of the Msg3 PUSCH. The repetition type (PUSCH repetition type A or B) of the Msg3 PUSCH is defined in advance or notified to the UE by the base station via broadcast.

At the Terminal Side:

the legacy UE transmits the Msg3 PUSCH of the first transmission for one time according to the time domain positions of the Msg3 PUSCH indicated by the RAR;

the legacy UE transmits the Msg3 PUSCH of the retransmission for one time according to the time domain positions indicated by the DCI 0_0 scheduling the retransmission; and the UE of the CE type continuously transmits the Msg3 PUSCH of the first transmission for K1 times from the time domain positions of the Msg3 PUSCH indicated by the RAR.

The number of repetitions K1 for the first transmission of the Msg3 PUSCH is determined according to the mapping relationship between the MCS indicated by the received RAR and the number of repetitions, or determined according to the mapping relationship between the indicated TA and the number of repetitions.

The mapping relationship between the MCS and the number of repetitions or the mapping relationship between the TA and the number of repetitions is defined in advance or notified to the UE by the base station via broadcast information.

The repetition type (PUSCH repetition type A or B) of the Msg3 PUSCH is defined in advance or notified to the UE by the base station via broadcast.

The UE of the CE type continuously transmits the Msg3 PUSCH of the retransmission for K2 times from the time domain positions indicated by the DCI 0_0 scheduling the retransmission.

The number of repetitions K2 for the retransmission of the Msg3 PUSCH is determined according to the mapping relationship between the MCS indicated by the DCI 0_0 scheduling the retransmission and the number of repetitions, or determined according to the number of repetitions K1 for the first transmission of the Msg3 PUSCH.

If the number of repetitions K2 for the retransmission of the Msg3 PUSCH is determined according to the mapping relationship between the MCS and the number of repetitions, the mapping relationship is defined in advance or notified to the UE by the base station via broadcast information; and If the number of repetitions for the retransmission of the Msg3 PUSCH is determined according to the number of repetitions K1 for the first transmission, then K1=K2, or K2=K1+delta, wherein the delta is an integer number not less than 0 which is defined in advance or indicated by the base station via broadcast information.

The repetition type (PUSCH repetition type A or B) of the Msg3 PUSCH is defined in advance or notified to the UE by the base station via broadcast.

At the Base Station Side:

the base station performs the blind detections on the first transmission of the Msg3 PUSCH for K1' times continuously from the time domain positions of the Msg3 PUSCH indicated by the RAR, and determine whether there are repetitions of the Msg3 PUSCH or not and the number of repetitions according to the result of the blind detections; or the base station performs the blind detections on the retransmission of the Msg3 PUSCH for K2' times continuously from the time domain positions indicated by the DCI 0_0 scheduling the retransmission, and determine whether there are repetitions of the Msg3 PUSCH or not and the number of repetitions according to the result of the blind detections.

K1' is determined according to the mapping relationship between the MCS indicated by the RAR and the number of repetitions, or determined according to the mapping relationship between the TA indicated by the RAR and the number of repetitions.

The mapping relationship between the MCS and the number of repetitions or the mapping relationship between the TA and the number of repetitions is defined in advance or notified to the UE by the base station via broadcast information.

The repetition type (PUSCH repetition type A or B) of the Msg3 PUSCH is defined in advance or notified to the UE by the base station via broadcast.

K2' is determined according to the mapping relationship between the MCS indicated by the DCI 0_0 scheduling the retransmission and the number of repetitions, or determined according to the number of repetitions K1 for the first transmission of the Msg3 PUSCH.

If K2 is determined according to the mapping relationship between the MCS and the number of repetitions, the mapping relationship is defined in advance or notified to the UE by the base station via broadcast information; and If K2 is determined according to the number of repetitions K1 for the first transmission, then K2=K1, or K2=K1+delta, wherein the delta is an integer number not less than 0 which is defined in advance or indicated by the base station via broadcast information.

The repetition type (PUSCH repetition type A or B) of the Msg3 PUSCH is defined in advance or notified to the UE by the base station via broadcast.

Scheme 3: Scheme B is adopted for the first transmission at the UE side, and Scheme B is adopted for the retransmission at the UE side, and Scheme B is adopted at the base station side.

The base station does not identify the UE of the CE type and the legacy UE, and when the base station receives the Msg3 PUSCH of the first transmission or retransmission, whether there are repeated receptions or not and the number of repetitions are determined through the blind detections. The range of the blind detections is a predefined number of repetitions. The number of repetitions for the UE to transmit the Msg3 PUSCH of the first transmission is determined by the UE itself according to the measured RSRP of the SSB, and the number of repetitions for the UE to transmit the Msg3 PUSCH of the retransmission is the same as the number of repetitions for the first transmission of the Msg3 PUSCH. The mapping relationship between the RSRP and the number of repetitions for the Msg3 PUSCH is defined in advance or notified to the UE by the base station via broadcast information.

At the Terminal Side:

the legacy UE transmits the Msg3 PUSCH of the first transmission for one time according to the time domain positions of the Msg3 PUSCH indicated by the RAR;

the legacy UE transmits the Msg3 PUSCH of the retransmission for one time according to the time domain positions indicated by the DCI 0_0 scheduling the retransmission; and the UE of the CE type continuously transmits the Msg3 PUSCH of the first transmission for K times from the time domain positions of the Msg3 PUSCH indicated by the RAR.

The number of repetitions K for the Msg3 PUSCH is determined according to the mapping relationship between the RSRP result measured for the SSB and the number of repetitions.

The mapping relationship between the RSRP and the number of repetitions is defined in advance or notified to the UE by the base station via broadcast information.

The repetition type (PUSCH repetition type A or B) of the Msg3 PUSCH is defined in advance or notified to the UE by the base station via broadcast.

The UE of the CE type continuously transmits the Msg3 PUSCH of the retransmission for K times from the time domain positions indicated by the DCI 0_0 scheduling the retransmission.

K is the number of repetitions for the first transmission of the Msg3 PUSCH.

The repetition type (PUSCH repetition type A or B) of the Msg3 PUSCH is defined in advance or notified to the UE by the base station via broadcast.

At the Base Station Side:

the base station continuously performs the blind detections on the first transmission of the Msg3 PUSCH for K0 times from the time domain positions of the Msg3 PUSCH indicated by the RAR.

K0 is a predefined value.

The base station continuously performs the blind detections on the retransmission of the Msg3 PUSCH for K0 times from the time domain positions indicated by the DCI 0_0 scheduling the retransmission, and determines whether there are repetitions of the Msg3 PUSCH or not and the number of the repetitions according to the result of the blind detections.

If the base station has information on the number of repetitions for the first transmission of the Msg3 PUSCH, then K0 is the number of repetitions for the first transmission of the Msg3 PUSCH; otherwise, K0 is a predefined value.

Scheme 4: Scheme B is adopted for the first transmission at the UE side, and Scheme B is adopted for the retransmission at the UE side, and Scheme A is adopted at the base station side.

The base station identifies the UE of the CE type and the legacy UE by PRACH, and the base station determines the number of repetitions through the blind detections only when receiving the Msg3 PUSCH of the first transmission and the Msg3 PUSCH of the retransmission from the UE of the CE type. The range of the blind detections is the predefined number of repetitions. The number of repetitions for the UE to transmit the Msg3 PUSCH of the first transmission is determined by the UE itself according to the measured RSRP of the SSB, and the number for retransmission of the Msg3 PUSCH is the same as the number for its first transmission.

At the Terminal Side:

the legacy UE transmits the Msg3 PUSCH of the first transmission for one time according to the time domain positions of the Msg3 PUSCH indicated by the RAR;

the legacy UE transmits the Msg3 PUSCH of the retransmission for one time according to the time domain positions indicated by the DCI 0_0 scheduling the retransmission; and the UE of the CE type continuously transmits the Msg3 PUSCH of the first transmission for K times from the time domain positions of the Msg3 PUSCH indicated by the RAR.

The number of repetitions K for the Msg3 PUSCH is determined according to the mapping relationship between the RSRP result measured for the SSB and the number of repetitions.

The mapping relationship between the RSRP and the number of repetitions is defined in advance or notified to the UE by the base station via broadcast information.

The repetition type (PUSCH repetition type A or B) of the Msg3 PUSCH is defined in advance or notified to the UE by the base station via broadcast.

The UE of the CE type continuously transmits the Msg3 PUSCH of the retransmission for K times from the time domain positions indicated by the DCI 0_0 scheduling the retransmission.

The number of repetitions K for the Msg3 PUSCH is determined according to the mapping relationship between the RSRP result measured for the SSB and the number of repetitions.

K is the number of repetitions for the first transmission of the Msg3 PUSCH.

The repetition type (PUSCH repetition type A or B) of the Msg3 PUSCH is defined in advance or notified to the UE by the base station via broadcast.

At the Base Station Side:

if the base station determines that the UE is a legacy UE, the base station only receives the Msg3 PUSCH of the first transmission for one time on the time domain positions of the Msg3 PUSCH indicated by the RAR, or receives the Msg3 PUSCH of the retransmission for one time on the time domain positions indicated by the DCI 0_0 scheduling the retransmission; and if the base station determines that the UE is a UE of the CE type, the base station continuously performs the blind detections on the first transmission of the Msg3 PUSCH for K0 times from the time domain positions of the Msg3 PUSCH indicated by the RAR, or continuously performs the blind detections on the retransmission of the Msg3 PUSCH for K1 times from the time domain positions indicated by the DCI 0_0 scheduling the retransmission, and determines whether there are repetitions of the Msg3 PUSCH or not and the number of the repetitions.

K0 is a predefined value.

If the base station has information on the number of repetitions for the first transmission of the Msg3 PUSCH, then K1 is the number of repetitions for the first transmission of the Msg3 PUSCH; otherwise, K1 is a predefined value, and the repetition type of the Msg3 PUSCH (PUSCH repetition type A or B) is defined in advance or notified to the UE by the base station via broadcast.

In the previous two steps, the method of the base station determining the type of the UE may be:

the base station allocates the UE of the CE type and the legacy UE with different PRACH resource sets or different preamble format sets, or indicates different PRACH target power; and when receiving the PRACH, the base station determines whether the type of the UE is the UE of the CE type or the legacy UE according to the PRACH resource set to which the PRACH belongs or the set to which the preamble format belongs or the range of the received PRACH power.

Scheme 5: Scheme A.2 is adopted for the first transmission at the UE side, and Scheme B is adopted for the retransmission at the UE side, and Scheme A or Scheme B is adopted at the base station side.

Through a 1-bit channel state information (CSI) request field in the RAR, the base station indicates whether the UE of the CE type is required to transmit the Msg3 PUSCH of the first transmission using a repetitions manner or not, whether the UE of the CE type is required to transmit the Msg3 PUSCH of the retransmission using a repetitions manner or not, and whether the numbers of repetitions for the first transmission and the retransmission of the Msg3 PUSCH are the same or not. The number of repetitions is defined in advance or notified to the UE by the base station via broadcast information, and the CSI request field is the idle bit field as described above.

At the Terminal Side:
  the legacy UE transmits the Msg3 PUSCH of the first transmission for one time according to the time domain positions of the Msg3 PUSCH indicated by the RAR;
  the legacy UE transmits the Msg3 PUSCH of the retransmission for one time according to the time domain positions indicated by the DCI 0_0 scheduling the retransmission; and
  the UE of the CE type determines whether the repetitions are required for the first transmission of the Msg3 PUSCH or not according to the value of the CSI request field in the RAR.
    If the CSI request field indicates that the repetitions of the Msg3 PUSCH are enabled, the UE continuously transmits the Msg3 PUSCH of the first transmission for K times from the time domain positions of the Msg3 PUSCH indicated by the RAR.
      K is a predefined value or notified to the UE by the base station via broadcast information.
      The repetition type (PUSCH repetition type A or B) of the Msg3 PUSCH is defined in advance or notified to the UE by the base station via broadcast.
    If the CSI request field indicates that the repetitions of the Msg3 PUSCH are not enabled, the UE transmits the Msg3 PUSCH of the first transmission for one time from the time domain positions of the Msg3 PUSCH indicated by the RAR.
  The UE of the CE type determines whether repetitions are required for the retransmission of the Msg3 PUSCH or not according to whether the repetitions for the first transmission of the Msg3 PUSCH are enabled or not.
    If the repetitions are enabled for the first transmission of the Msg3 PUSCH, the Msg3 PUSCH of the retransmission is transmitted continuously for K times from the time domain positions indicated by the DCI 0_0 scheduling the retransmission.
      K is a predefined value or notified to the UE by the base station via broadcast information.
      The repetition type (PUSCH repetition type A or B) of the Msg3 PUSCH is defined in advance or notified to the UE by the base station via broadcast.
    If the repetitions are not enabled for the first transmission of the Msg3 PUSCH, the Msg3 PUSCH of the retransmission is transmitted for one time from the time domain positions indicated by the DCI 0_0 scheduling the retransmission.

At the Base Station Side:
  if the base station may determine and identify that the UE is a legacy UE or a CE UE based on the PRACH resource set to which the PRACH transmitted by the UE belongs or the set to which the preamble format belongs or the range of the received PRACH power, then:
    the base station receives the Msg3 PUSCH of the first transmission for one time for the legacy UE from the time domain positions of the Msg3 PUSCH indicated by the RAR, or receives the Msg3 PUSCH of the retransmission for one time on the time domain positions indicated by the DCI 0_0 scheduling the retransmission; and
    for the UE of the CE type, the base station determines whether it is necessary to continuously receive the Msg3 PUSCH of the first transmission for K times from the time domain positions of the Msg3 PUSCH indicated by the RAR, or whether it is necessary to continuously receive the Msg3 PUSCH of the retransmission for K times from the time domain positions indicated by the DCI 0_0 scheduling the retransmission, according to the value of the CSI request field in the RAR.
      If the CSI request field in the RAR scheduling the first transmission indicates that the repetitions of the Msg3 PUSCH are enabled, then the base station continuously receives the Msg3 PUSCH of the first transmission for K times from the time domain positions of the Msg3 PUSCH indicated by the RAR, or continuously receives the Msg3 PUSCH of the retransmission for K times from the time domain positions indicated by the DCI 0_0 scheduling the retransmission.
        K is a predefined value or notified to the UE by the base station via broadcast information.
        The repetition type (PUSCH repetition type A or B) of the Msg3 PUSCH is defined in advance or notified to the UE by the base station via broadcast.
      If the CSI request field in the RAR scheduling the first transmission indicates that the repetitions of the Msg3 PUSCH are not enabled, then the base station receives the Msg3 PUSCH of the first transmission for one time on the time domain positions of the Msg3 PUSCH indicated by the RAR, or receives the Msg3 PUSCH of the retransmission for one time on the time domain positions indicated by the DCI 0_0 scheduling the retransmission.
  If the base station may not determine and identify that the UE is a legacy UE or a CE UE based on the PRACH resource set to which the PRACH transmitted by the UE belongs or the set to which the preamble format belongs or the range of the received PRACH power, then:
    the base station determines whether it is necessary to perform the blind detections on the first transmission of the Msg3 PUSCH with K times from the time domain positions of the Msg3 PUSCH indicated by the RAR or whether it is necessary to perform the blind detections on the retransmission of the Msg3 PUSCH with K times from the time domain positions indicated by the DCI 0_0 scheduling the retransmission, according to the value of the CSI request field in the RAR.
      If the CSI request field in the RAR scheduling the first transmission indicates that the repetitions of the Msg3 PUSCH are enabled, then the base station continuously performs the blind detections on the first transmission of the Msg3 PUSCH with K times from the time domain positions of the Msg3 PUSCH indicated by the RAR, or continuously performs the blind detections on the retransmission of the Msg3 PUSCH with K times from the time domain positions indicated by the DCI 0_0 scheduling the retransmission.

K is a predefined value or notified to the UE by the base station via broadcast information.

The repetition type (PUSCH repetition type A or B) of the Msg3 PUSCH is defined in advance or notified to the UE by the base station via broadcast.

If the CSI request field in the RAR scheduling the first transmission indicates that the repetitions of the Msg3 PUSCH are not enabled, then the base station receives the Msg3 PUSCH of the first transmission for one time on the time domain positions of the Msg3 PUSCH indicated by the RAR, or receives the Msg3 PUSCH of the retransmission for one time on the time domain positions indicated by the DCI 0_0 scheduling the retransmission.

Scheme 6: Scheme A.3 is adopted for the first transmission at the UE side, and Scheme B is adopted for the retransmission at the UE side, and Scheme A or Scheme B is adopted at the base station side.

Through a bit field indicating the number of repetitions for the Msg3 PUSCH in the RAR, the base station indicates the number of repetitions for the UE to transmit the Msg3 PUSCH of the first transmission is one from among a set of values. The number of repetitions for the UE to transmit the Msg3 PUSCH of the retransmission is the same as that for the Msg3 PUSCH of the first transmission, wherein the set of values is defined in advance or notified to the UE by the base station via broadcast information.

At the Terminal Side:
the legacy UE transmits the Msg3 PUSCH of the first transmission for one time according to the time domain positions of the Msg3 PUSCH indicated by the RAR;
the legacy UE transmits the Msg3 PUSCH of the retransmission for one time according to the time domain positions indicated by the DCI 0_0 scheduling the retransmission; and
the UE of the CE type continuously transmits the Msg3 PUSCH of the first transmission with repetitions of K times from the time domain positions of the Msg3 PUSCH indicated by the RAR.
  K is a value indicated by the bit field indicating the number of repetitions for the Msg3 PUSCH in the RAR.
  The repetition type (PUSCH repetition type A or B) of the Msg3 PUSCH is defined in advance or notified to the UE by the base station via broadcast.
The UE of the CE type continuously transmits the Msg3 PUSCH of the retransmission with repetitions of K times from the time domain positions indicated by the DCI 0_0 scheduling the retransmission.
  K is a value indicated by the bit field indicating the number of repetitions for the Msg3 PUSCH in the RAR scheduling the first transmission of the Msg3 PUSCH.
  The repetition type (PUSCH repetition type A or B) of the Msg3 PUSCH is defined in advance or notified to the UE by the base station via broadcast.

At the Base Station Side:
if the base station may determine and identify that the UE is a legacy UE or a CE UE based on the PRACH resource set to which the PRACH transmitted by the UE belongs or the set to which the preamble format belongs or the range of the received PRACH power, then:
the base station receives the Msg3 PUSCH of the first transmission for one time for the legacy UE from the time domain positions of the Msg3 PUSCH indicated by the RAR, or receives the Msg3 PUSCH of the retransmission for one time on the time domain positions indicated by the DCI 0_0 scheduling the retransmission; and
the base station continuously receives the Msg3 PUSCH of the first transmission with repetitions of K times for the UE of the CE type from the time domain positions of the Msg3 PUSCH indicated by the RAR.
  K is a value indicated by the bit field indicating the number of repetitions for the Msg3 PUSCH in the RAR.
  The repetition type (PUSCH repetition type A or B) of the Msg3 PUSCH is defined in advance or notified to the UE by the base station via broadcast.
The base station continuously receives the Msg3 PUSCH of the retransmission with repetitions of K times for the UE of the CE type from the time domain positions indicated by the DCI 0_0 scheduling the retransmission.
  K is a value indicated by the bit field indicating the number of repetitions for the Msg3 PUSCH in the RAR scheduling the first transmission of the Msg3 PUSCH.
  The repetition type (PUSCH repetition type A or B) of the Msg3 PUSCH is defined in advance or notified to the UE by the base station via broadcast.

If the base station may not determine and identify that the UE is a legacy UE or a CE UE based on the PRACH resource set to which the PRACH transmitted by the UE belongs or the set to which the preamble format belongs or the range of the received PRACH power, then:
the base station performs the blind detections on the first transmission of the Msg3 PUSCH with repetitions of K times from the time domain positions of the Msg3 PUSCH indicated by the RAR.
  K is a value indicated by the bit field indicating the number of repetitions for the Msg3 PUSCH in the RAR.
  The repetition type (PUSCH repetition type A or B) of the Msg3 PUSCH is defined in advance or notified to the UE by the base station via broadcast.
The base station performs the blind detections on the retransmission of the Msg3 PUSCH with repetitions of K times from the time domain positions indicated by the DCI 0_0 scheduling the retransmission.
  K is a value indicated by the bit field indicating the number of repetitions for the Msg3 PUSCH in the RAR scheduling the first transmission of the Msg3 PUSCH.
  The repetition type (PUSCH repetition type A or B) of the Msg3 PUSCH is defined in advance or notified to the UE by the base station via broadcast.

Scheme 7: Scheme C is adopted for the first transmission at the UE side, and Scheme B is adopted for the retransmission at the UE side, and Scheme A or Scheme B is adopted at the base station side.

The number of repetitions for the first transmission of the Msg3 PUSCH is determined according to a set to which PRACH resources transmitted by the UE belong to and a set to which a preamble format belongs, and the number of repetitions for the retransmission of the Msg3 PUSCH is the same as the number of repetitions for the first transmission of the Msg3 PUSCH. The mapping relationship between the set to which the PRACH resources belong or the set to which the preamble format belongs and the number of repetitions for the Msg3 PUSCH is defined in advance or notified to the UE by the base station via broadcast information.

At the Terminal Side:

the legacy UE transmits the Msg3 PUSCH of the first transmission for one time according to the time domain positions of the Msg3 PUSCH indicated by the RAR;

the legacy UE transmits the Msg3 PUSCH of the retransmission for one time according to the time domain positions indicated by the DCI 0_0 scheduling the retransmission; and the UE of the CE type continuously transmits the Msg3 PUSCH of the first transmission with repetitions of K times from the time domain positions of the Msg3 PUSCH indicated by the RAR.

K is determined by the UE according to the mapping relationship between the set to which the transmitted PRACH resources belong or the set to which the preamble format belongs and the number of repetitions for the Msg3 PUSCH.

The mapping relationship between the set to which the PRACH resources belong or the set to which the preamble format belongs and the number of repetitions for the Msg3 PUSCH is defined in advance or notified to the UE by the base station via broadcast information.

The repetition type (PUSCH repetition type A or B) of the Msg3 PUSCH is defined in advance or notified to the UE by the base station via broadcast.

The UE of the CE type continuously transmits the Msg3 PUSCH of the retransmission with repetitions of K times from the time domain positions indicated by the DCI 0_0 scheduling the retransmission.

K is the number of repetitions for the first transmission of the Msg3 PUSCH.

The repetition type (PUSCH repetition type A or B) of the Msg3 PUSCH is defined in advance or notified to the UE by the base station via broadcast.

At the Base Station Side:

if the base station may determine and identify that the UE is a legacy UE or a CE UE based on the PRACH resource set to which the PRACH transmitted by the UE belongs or the set to which the preamble format belongs or the range of the received PRACH power, then:

the base station receives the Msg3 PUSCH of the first transmission for one time for the legacy UE from the time domain positions of the Msg3 PUSCH indicated by the RAR, or receives the Msg3 PUSCH of the retransmission for one time on the time domain positions indicated by the DCI 0_0 scheduling the retransmission; and the base station continuously receives the Msg3 PUSCH of the first transmission with repetitions of K times for the UE of the CE type from the time domain positions of the Msg3 PUSCH indicated by the RAR.

K is determined by the UE according to the mapping relationship between the set to which the transmitted PRACH resources belong or the set to which the preamble format belongs and the number of repetitions for the Msg3 PUSCH.

The mapping relationship between the set to which the PRACH resources belong or the set to which the preamble format belongs and the number of repetitions for the Msg3 PUSCH is defined in advance or notified to the UE by the base station via broadcast information.

The repetition type (PUSCH repetition type A or B) of the Msg3 PUSCH is defined in advance or notified to the UE by the base station via broadcast.

The base station continuously receives the Msg3 PUSCH of the retransmission with repetitions of K times for the UE of the CE type from the time domain positions indicated by the DCI 0_0 scheduling the retransmission.

K is the number of repetitions for the first transmission of the Msg3 PUSCH.

The repetition type (PUSCH repetition type A or B) of the Msg3 PUSCH is defined in advance or notified to the UE by the base station via broadcast.

If the base station may not determine and identify that the UE is a legacy UE or a CE UE based on the PRACH resource set to which the PRACH transmitted by the UE belongs or the set to which the preamble format belongs or the range of the received PRACH power, then:

the base station performs the blind detections on the first transmission of the Msg3 PUSCH with repetitions of K times for the UE of the CE type from the time domain positions of the Msg3 PUSCH indicated by the RAR.

K is determined by the UE according to the mapping relationship between the set to which the transmitted PRACH resources belong or the set to which the preamble format belongs and the number of repetitions for the Msg3 PUSCH.

The mapping relationship between the set to which the PRACH resources belong or the set to which the preamble format belongs and the number of repetitions for the Msg3 PUSCH is defined in advance or notified to the UE by the base station via broadcast information.

The repetition type (PUSCH repetition type A or B) of the Msg3 PUSCH is defined in advance or notified to the UE by the base station via broadcast.

The base station performs the blind detections on the retransmission of the Msg3 PUSCH with repetitions of K times for the UE of the CE type from the time domain positions indicated by the DCI 0_0 scheduling the retransmission.

K is the number of repetitions for the first transmission of the Msg3 PUSCH.

The repetition type (PUSCH repetition type A or B) of the Msg3 PUSCH is defined in advance or notified to the UE by the base station via broadcast.

Example 1

It is assumed that the legacy UE and the UE of the CE type are allocated with different PRACH resource sets (e.g., a PRACH resource set 1 is used by the legacy UE and a PRACH resource set 2 is used by the UE of the CE type), or allocated with different preamble format sets (e.g., a preamble format set 1 is used by the legacy UE and a preamble format set 2 is used by the UE of the CE type), or designated with different PRACH target powers (e.g., a PRACH target power 1 is used by the legacy UE and a PRACH target power 2 is used by the UE of the CE type) respectively, UE #1 is a legacy UE, UE #2 is a UE of the CE type and each of the MCS indexes that are indicated by the RAR and received by UE #1 and UE #2 is a MCS index #5; the mapping relationship between the MCS index indicated by the RAR and a number of repetitions K, which is defined in advance or notified to the UE by the base station via broadcast information, is: the number of repetitions K corresponding to the MCS index #0-3 is 8, the number of repetitions K corresponding to the MCS index #4-7 is 4, the number of repetitions K corresponding to the MCS index #8-11 is 2, and the number of repetitions K corresponding to the MCS index #12-15 is 1. It is assumed that each of the MCS indexes indicated by the DCI 0_0 scheduling the retransmission of the Msg3 PUSCH for UE #1 and UE #2 is MCS index #5, and the mapping relationship between the MCS index indicated by the DCI 0_0 scheduling the retransmission of the Msg3 PUSCH and the number of repetitions K, which is defined in advance or notified to the UE by the base station via broadcast information, is: the number of repetitions K corresponding to the MCS index #0-7 is 8, the number of repetitions K corresponding to MCS index #8-15 is 4, the number of repetitions K corresponding to MCS index #16-23 is 2, and the number of repetitions K corresponding to the MCS index #23-29 is 1.

Then at UE Side:
PRACH transmission
when transmitting the PRACH, UE #1 uses the PRACH resources in the PRACH resource set 1 or uses the preamble formats in the preamble format set 1, or uses the PRACH target power 1 for PRACH power control; and
when transmitting the PRACH, UE #2 uses the PRACH resources in the PRACH resource set 2 or uses the preamble formats in the preamble format set 2, or uses the PRACH target power 2 for PRACH power control.

First transmission of the Msg3 PUSCH
UE #1 transmits the Msg3 PUSCH of the first transmission for one time according to the time domain positions of the Msg3 PUSCH indicated by the RAR; and
UE #2 determines that the number of repetitions K for the Msg3 PUSCH is 4 according to the MCS index #5 indicated by the RAR, and UE #2 continuously transmits the Msg3 PUSCH of the first transmission with 4 times from the time domain positions of the Msg3 PUSCH indicated by the RAR.

Retransmission of the Msg3 PUSCH
UE #1 transmits the Msg3 PUSCH of the retransmission for one time according to the time domain positions indicated by the DCI 0_0 scheduling the retransmission;
UE #2 determines that the number of repetitions K for the Msg3 PUSCH is 8 according to the MCS index #5 indicated by the DCI 0_0 scheduling the retransmission, and UE #2 continuously transmits the Msg3 PUSCH of the retransmission with 8 times from the time domain positions indicated by the DCI 0_0 scheduling the retransmission; or
UE #2 determines that the number of repetitions K for the retransmission of the Msg3 PUSCH is 4 according to the number of repetitions for the first transmission of the Msg3 PUSCH, and UE #2 continuously transmits the Msg3 PUSCH of the retransmission with 4 times from the time domain positions indicated by the DCI 0_0 scheduling the retransmission.

At the Base Station Side:
the base station determines the type of the UE according to the received PRACH.
When it is found that the PRACH resources used by UE #1 belong to the PRACH resource set 1, or the preamble format set 1 is used, or the used PRACH power is within the range corresponding to the PRACH target power 1, UE #1 is considered to be a legacy UE; and
When it is found that the PRACH resources used by UE #2 belong to the PRACH resource set 2, or the preamble format set 2 is used, or the used PRACH power is within the range corresponding to the PRACH target power 2, UE #2 is considered to be a UE of the CE type.

Reception for the first transmission of the Msg3 PUSCH by the base station
The base station receives the Msg3 PUSCH of the first transmission for one time on the time domain positions of the Msg3 PUSCH indicated by the RAR for UE #1; and
The base station determines that the number of repetitions K for the first transmission of the Msg3 PUSCH is 4 according to the MCS index #5 indicated by the RAR of UE #2, and the base station continuously receives the Msg3 PUSCH of the first transmission with 4 times from the time domain positions of the Msg3 PUSCH indicated by the RAR of UE #2.

Reception for the retransmission of the Msg3 PUSCH by the base station
The base station receives the Msg3 PUSCH of the retransmission for one time on the time domain positions indicated by the DCI 0_0 scheduling the retransmission of UE #1;
The base station determines that the number of repetitions K for the retransmission of the Msg3 PUSCH is 8 according to the MCS index #5 indicated by the DCI 0_0 scheduling the retransmission of UE #2, and the base station continuously receives the Msg3 PUSCH of the retransmission with 8 times from the time domain positions indicated by the DCI 0_0 scheduling the retransmission of UE #2; or
The base station determines that the number of repetitions K for the retransmission of the Msg3 PUSCH is 4 according to the number of repetitions for the first transmission of the Msg3 PUSCH of UE #2, and the base station continuously receives the Msg3 PUSCH of the retransmission with 4 times from the time domain positions indicated by the DCI 0_0 scheduling the retransmission of UE #2.
The above rules for the base station to determine the number of repetitions for the retransmission of the Msg3 PUSCH of UE #2 should be consistent with those for the UE side to determine the number of repetitions for the retransmission of the Msg3 PUSCH.

Example 2

It is assumed that the legacy UE and the UE of the CE type are allocated with different PRACH resource sets (e.g., a PRACH resource set 1 is used by the legacy UE and a PRACH resource set 2 is used by the UE of the CE type), or allocated with different preamble format sets, respectively (e.g., a preamble format set 1 is used by the legacy UE and a preamble format set 2 is used by the UE of the CE type), or designated with different PRACH target powers (e.g., a PRACH target power 1 is used by the legacy UE and the PRACH target power 2 is used by the UE of the CE type), UE #1 is a legacy UE, UE #2 is a UE of the CE type and each of the TA values that are indicated by the RAR and received by UE #1 and UE #2 is 1200; the mapping relationship between the TA indicated by the RAR and the number of repetitions K, which is notified by the base station via broadcast information, is: the number of repetitions K corresponding to the TA #0-999 is 1, the number of repetitions K corresponding to the TA #1000-1999 is 2, the number of repetitions K corresponding to the TA #2000-2999 is 4, and the number of repetitions K corresponding to the TA #3000-3846 is 8. It is assumed that each of the MCS indexes indicated by the DCI 0_0 scheduling the retransmission of the Msg3 PUSCH of UE #1 and UE #2 is MCS index #5, and the mapping relationship between the MCS index indicated by the DCI 0_0 scheduling the retransmission of the Msg3 PUSCH and the number of repetitions K, which is defined in advance or notified by the base station via broadcast information, is: the number of repetitions K corresponding to MCS index #0-7 is 8, the number of repetitions K corresponding to MCS index #8-15 is 4, the number of repetitions K corresponding to MCS index #16-23 is 2, and the number of repetitions K corresponding to the MCS index #23-29 is 1.

Then at UE Side:
  PRACH transmission
    when transmitting the PRACH, UE #1 uses the PRACH resources in the PRACH resource set 1, or uses the preamble formats in the preamble format set 1, or uses the PRACH target power 1 for PRACH power control; and
    when transmitting the PRACH, UE #2 uses the PRACH resources in the PRACH resource set 2, or uses the preamble formats in the preamble format set 2, or uses the PRACH target power 2 for PRACH power control.
  First transmission of the Msg3 PUSCH
    UE #1 transmits the Msg3 PUSCH of the first transmission for one time according to the time domain positions of the Msg3 PUSCH indicated by the RAR; and
    UE #2 determines that the number of repetitions K for the Msg3 PUSCH is 2 according to TA value of 1200 indicated by the RAR, and UE #2 continuously transmits the Msg3 PUSCH of the first transmission with 2 times from the time domain positions of the Msg3 PUSCH indicated by the RAR.
  Retransmission of the Msg3 PUSCH
    UE #1 transmits the Msg3 PUSCH of the retransmission for one time according to the time domain positions indicated by the DCI 0_0 scheduling the retransmission;
    UE #2 determines that the number of repetitions K for the Msg3 PUSCH is 8 according to the MCS index #5 indicated by the DCI 0_0 scheduling the retransmission, and UE #2 continuously transmits the Msg3 PUSCH of the retransmission with 8 times from the time domain positions indicated by the DCI 0_0 scheduling the retransmission; or
    UE #2 determines that the number of repetitions K for the retransmission of the Msg3 PUSCH is 2 according to the number of repetitions for the first transmission of the Msg3 PUSCH, and UE #2 continuously transmits the Msg3 PUSCH of the retransmission with 2 times from the time domain positions indicated by the DCI 0_0 scheduling the retransmission.

At the Base Station Side:
  the base station determines the type of the UE according to the received PRACH.
    When it is found that the PRACH resources used by UE #1 belong to the PRACH resource set 1, or the preamble format set 1 is used, or the used PRACH power is within the range corresponding to the PRACH target power 1, UE #1 is considered to be a legacy UE; and
    When it is found that the PRACH resources used by UE #2 belong to the PRACH resource set 2, or the preamble format set 2 is used, or the used PRACH power is within the range corresponding to the PRACH target power 2, UE #2 is considered to be a UE of the CE type.
  Reception for the first transmission of the Msg3 PUSCH by the base station
    The base station receives the Msg3 PUSCH of the first transmission for one time on the time domain positions of the Msg3 PUSCH indicated by the RAR of UE #1; and
    The base station determines that the number of repetitions K for the first transmission of the Msg3 PUSCH is 2 according to TA value of 1200 indicated by the RAR of UE #2, and the base station continuously receives the Msg3 PUSCH of the first transmission with 2 times from the time domain positions of the Msg3 PUSCH indicated by the RAR of UE #2.
  Reception for the retransmission of the Msg3 PUSCH by the base station
    The base station receives the Msg3 PUSCH of the retransmission for one time on the time domain positions indicated by the DCI 0_0 scheduling the retransmission for UE #1;
    The base station determines that the number of repetitions K for the retransmission of the Msg3 PUSCH is 8 according to the MCS index #5 indicated by the DCI 0_0 scheduling the retransmission of UE #2, and the base station continuously receives the Msg3 PUSCH of the retransmission with 8 times from the time domain positions indicated by the DCI 0_0 scheduling the retransmission of UE #2; or
    The base station determines that the number of repetitions K for the retransmission of the Msg3 PUSCH is 2 according to the number of repetitions for the first transmission of the Msg3 PUSCH of UE #2, and the base station continuously receives the Msg3 PUSCH of the retransmission with 2 times from the time domain positions indicated by the DCI 0_0 scheduling the retransmission of UE #2.
    The above rules for the base station to determine the number of repetitions for the retransmission of the Msg3 PUSCH of UE #2 should be consistent with those for the UE side to determine the number of repetitions for the retransmission of the Msg3 PUSCH.

Example 3

The base station may not identify the legacy UE and the UE of the CE type, UE #1 is a legacy UE, UE #2 is a UE of the CE type, and each of the MCS indexes which are indicated by the RAR and received by UE #1 and UE #2 is MCS index #5. It is assumed that the mapping relationship between the MCS index indicated by the RAR and the number of repetitions K, which is defined in advance or notified by the base station via broadcast information, is: the number of repetitions K corresponding to MCS index #0-3 is 8, the number of repetitions K corresponding to MCS index #4-7 is 4, the number of repetitions K corresponding to MCS index #8-11 is 2, and the number of repetitions K corresponding to MCS index #12-15 is 1. Each of the MCS indexes indicated by the DCI 0_0 scheduling the retransmission of the Msg3 PUSCH of UE #1 and UE #2 is MCS index #5, and it is assumed that the mapping relationship between the MCS index indicated by the DCI 0_0 scheduling the retransmission of the Msg3 PUSCH of UE #1 and UE #2 and the number of repetitions K, which is defined in advance or notified by the base station via broadcast information, is: the number of repetitions K corresponding to the MCS index #0-7 is 8, the number of repetitions K corresponding to MCS index #8-15 is 4, the number of repetitions K corresponding to MCS index #16-23 is 2, and the number of repetitions K corresponding to the MCS index #23-29 is 1.

Then at UE Side:
- First transmission of the Msg3 PUSCH
  - UE #1 transmits the Msg3 PUSCH of the first transmission for one time according to the time domain positions of the Msg3 PUSCH indicated by the RAR; and
  - UE #2 determines that the number of repetitions K for the Msg3 PUSCH is 4 according to the MCS index #5 indicated by the RAR, and UE #2 continuously transmits the Msg3 PUSCH of the first transmission with 4 times from the time domain positions of the Msg3 PUSCH indicated by the RAR.
- Retransmission of the Msg3 PUSCH
  - UE #1 transmits the Msg3 PUSCH of the retransmission for one time according to the time domain positions indicated by the DCI 0_0 scheduling the retransmission;
  - UE #2 determines that the number of repetitions K for the Msg3 PUSCH is 8 according to the MCS index #5 indicated by the DCI 0_0 scheduling the retransmission, and UE #2 continuously transmits the Msg3 PUSCH of the retransmission with 8 times from the time domain positions indicated by the DCI 0_0 scheduling the retransmission; or
  - UE #2 determines that the number of repetitions K for the retransmission of the Msg3 PUSCH is 4 according to the number of repetitions for the first transmission of the Msg3 PUSCH, and UE #2 continuously transmits the Msg3 PUSCH of the retransmission with 4 times from the time domain positions indicated by the DCI 0_0 scheduling the retransmission.

At the Base Station Side:
- Reception for the first transmission of the Msg3 PUSCH by the base station
  - The base station determines that the number of repetitions K for the first transmission of the Msg3 PUSCH is 4 according to the MCS index #5 indicated by the RAR of UE #1, and the base station continuously performs blind detections on the first transmission of the Msg3 PUSCH with 4 times from the time domain positions of the Msg3 PUSCH indicated by the RAR of UE #1; and
  - The base station determines that the number of repetitions K for the first transmission of the Msg3 PUSCH is 4 according to the MCS index #5 indicated by the RAR of UE #2, and the base station continuously performs blind detections on the first transmission of the Msg3 PUSCH with 4 times from the time domain positions of the Msg3 PUSCH which are indicated by the RAR of UE #2.
- Reception for the retransmission of the Msg3 PUSCH by the base station
  - The base station determines that the number of repetitions K for the retransmission of the Msg3 PUSCH is 8 according to the MCS index #5 indicated by the DCI 0_0 scheduling the retransmission of UE #1, and the base station continuously performs blind detections on the retransmission of the Msg3 PUSCH with 8 times from the time domain positions indicated by the DCI 0_0 scheduling the retransmission of UE #1; or
  - The base station determines that the number of repetitions K for the retransmission of the Msg3 PUSCH is 4 according to the number of repetitions for the first transmission of the Msg3 PUSCH of UE #1, and the base station continuously performs blind detections on the first transmission of the Msg3 PUSCH with 4 times from the time domain positions indicated by the DCI 0_0 scheduling the retransmission of UE #1;
  - The base station determines that the number of repetitions K for the retransmission of the Msg3 PUSCH is 8 according to the MCS index #5 indicated by the DCI 0_0 scheduling the retransmission of UE #2, and the base station continuously receives the Msg3 PUSCH of the retransmission with 8 times from the time domain positions indicated by the DCI 0_0 scheduling the retransmission of UE #2; or
  - The base station determines that the number of repetitions K for the retransmission of the Msg3 PUSCH is 4 according to the number of repetitions for the first transmission of the Msg3 PUSCH of UE #2, and the base station continuously performs blind detections on the retransmission of the Msg3 PUSCH with 4 times from the time domain positions indicated by the DCI 0_0 scheduling the retransmission of UE #2.
  - The above rules for the base station to determine the number of repetitions for the retransmission of the Msg3 PUSCH should be consistent with those for the UE side to determine the number of repetitions for the retransmission of the Msg3 PUSCH.

Example 4

It is assumed that the base station may not identify the legacy UE and the UE of the CE type, UE #1 is a legacy UE, and UE #2 is a UE of the CE type. Each of the TA values which are indicated by the RAR and received by UE #1 and UE #2 is 1200, and itis assumed that the mapping relationship between the TA indicated by the RAR and the number of repetitions K, which is notified by the base station via broadcast information, is: the number of repetitions K corresponding to TA #0-999 is 1, the number of repetitions K corresponding to TA #1000-1999 is 2, the number of repetitions K corresponding to TA #2000-2999 is 4, and the number of repetitions K corresponding to TA #3000-3846 is 8. Each of the MCS indexes indicated by the DCI 0_0 scheduling the retransmission of the Msg3 PUSCH of UE #1 and UE #2 is MCS index #5, and it is assumed that the mapping relationship between the MCS index indicated by the DCI 0_0 scheduling the retransmission of the Msg3 PUSCH and the number of repetitions K, which is defined in advance or notified by the base station via broadcast information, is: the number of repetitions K corresponding to the MCS index #0-7 is 8, the number of repetitions K corresponding to MCS index #8-15 is 4, the number of repetitions K corresponding to MCS index #16-23 is 2, and the number of repetitions K corresponding to the MCS index #23-29 is 1.

Then at UE Side:
  First transmission of the Msg3 PUSCH
    UE #1 transmits the Msg3 PUSCH of the first transmission for one time according to the time domain positions of the Msg3 PUSCH indicated by the RAR; and
    UE #2 determines that the number of repetitions K for the Msg3 PUSCH is 2 according to TA value of 1200 indicated by the RAR, and UE #2 continuously transmits the Msg3 PUSCH of the first transmission with 2 times from the time domain positions of the Msg3 PUSCH indicated by the RAR.
  Retransmission of the Msg3 PUSCH
    UE #1 transmits the Msg3 PUSCH of the retransmission for one time according to the time domain positions indicated by the DCI 0_0 scheduling the retransmission;
    UE #2 determines that the number of repetitions K for the Msg3 PUSCH is 8 according to the MCS index #5 indicated by the DCI 0_0 scheduling the retransmission, and UE #2 continuously transmits the Msg3 PUSCH of the retransmission with 8 times from the time domain positions indicated by the DCI 0_0 scheduling the retransmission; or
    UE #2 determines that the number of repetitions K for the retransmission of the Msg3 PUSCH is 2 according to the number of repetitions for the first transmission of the Msg3 PUSCH, and UE #2 continuously transmits the Msg3 PUSCH of the retransmission with 2 times from the time domain positions indicated by the DCI 0_0 scheduling the retransmission.

At the Base Station Side:
  Reception for the first transmission of the Msg3 PUSCH by the base station
    The base station determines that the number of repetitions K for the Msg3 PUSCH is 2 according to TA value of 1200 indicated by the RAR of UE #1, and the base station continuously performs blind detections on the Msg3 PUSCH with 2 times from the time domain positions of the Msg3 PUSCH indicated by the RAR of UE #1;
    The base station determines that the number of repetitions K for the Msg3 PUSCH is 2 according to TA value of 1200 indicated by the RAR of UE #2, and the base station continuously performs blind detections on the Msg3 PUSCH with 2 times from the time domain positions of the Msg3 PUSCH indicated by the RAR of UE #2.
  Reception for the retransmission of the Msg3 PUSCH by the base station
    The base station determines that the number of repetitions K for the retransmission of the Msg3 PUSCH is 8 according to the MCS index #5 indicated by the DCI 0_0 scheduling the retransmission of UE #1, and the base station continuously performs blind detections on the retransmission of the Msg3 PUSCH with 8 times from the time domain positions indicated by the DCI 0_0 scheduling the retransmission of UE #1; or
    The base station determines that the number of repetitions K for the retransmission of the Msg3 PUSCH is 4 according to the number of repetitions for the first transmission of the Msg3 PUSCH of UE #1, and the base station continuously performs blind detections on the retransmission of the Msg3 PUSCH with 4 times from the time domain positions indicated by the DCI 0_0 scheduling the retransmission of UE #1;
    The base station determines that the number of repetitions K for the retransmission of the Msg3 PUSCH is 8 according to the MCS index #5 indicated by the DCI 0_0 scheduling the retransmission of UE #2, and the base station continuously performs blind detections on the retransmission of the Msg3 PUSCH with 8 times from the time domain positions indicated by the DCI 0_0 scheduling the retransmission of UE #2; or
    The base station determines that the number of repetitions K for the retransmission of the Msg3 PUSCH is 4 according to the number of repetitions for the first transmission of the Msg3 PUSCH of UE #2, and the base station continuously performs blind detections on the retransmission of the Msg3 PUSCH with 4 times from the time domain positions indicated by the DCI 0_0 scheduling the retransmission of UE #2.
    The above rules for the base station to determine the number of repetitions for the retransmission of the Msg3 PUSCH should be consistent with those for the UE side to determine the number of repetitions for the retransmission of the Msg3 PUSCH.

Example 5

It is assumed that the base station may not identify the legacy UE and the UE of the CE type, UE #1 is a legacy UE, UE #2 is a UE of the CE type, the predefined number of repetitions for blind detections K0 is 8, the RSRP measured by UE #1 for the SSB is −5 dBm, and the RSRP measured by UE #2 for the SSB is −5 dBm, and it is assumed that the mapping relationship between the RSRP and the number of repetitions K, which is defined in advance or notified by the base station via broadcast information, is: the number of repetitions K corresponding to RSRP less than −10 dBm is 8, the number of repetitions K corresponding to RSRP between −10 dBm and 0 dBm is 4, the number of repetitions K corresponding to RSRP between 0 dBm and 10 dBm is 2, and the number of repetitions K corresponding to RSRP greater than 10 dBm is 1.

Then at UE Side:
  First transmission of the Msg3 PUSCH
    UE #1 transmits the Msg3 PUSCH of the first transmission for one time according to the time domain positions of the Msg3 PUSCH indicated by the RAR;
    UE #2 determines that the number of repetitions K for Msg3 PUSCH is 4 according to measurement result on SSB that the RSRP is equal to −5 dBm, and UE #2 continuously transmits the Msg3 PUSCH of the first transmission with 4 times from the time domain positions of the Msg3 PUSCH indicated by the RAR.
  Retransmission of the Msg3 PUSCH
    UE #1 transmits the Msg3 PUSCH of the retransmission for one time according to the time domain positions indicated by the DCI 0_0 scheduling the retransmission;
    UE #2 determines that the number of repetitions K for the retransmission of the Msg3 PUSCH is 4 according to the number of repetitions for the first transmission of the Msg3 PUSCH, and UE #2 continuously transmits the Msg3 PUSCH of the retransmission with 4 times from the time domain positions indicated by the DCI 0_0 scheduling the retransmission.

At the Base Station Side:
  Reception for the first transmission of the Msg3 PUSCH by the base station
    According to the predefined number of repetitions for blind detections K0 of 8, the base station continuously performs blind detections on the first transmission of the Msg3 PUSCH for 8 times from the time domain positions of the Msg3 PUSCH indicated by the RAR of UE #1; and
    According to the predefined number of repetitions for blind detections K0 of 8, the base station continuously performs blind detections on the first transmission of the Msg3 PUSCH for 8 times from the time domain positions of the Msg3 PUSCH indicated by the RAR of UE #2.
  Reception for the retransmission of the Msg3 PUSCH by the base station
    According to the predefined number of repetitions for blind detections K0 of 8, the base station continuously performs blind detections on the retransmission of the Msg3 PUSCH for 8 times from the time domain positions indicated by the DCI 0_0 scheduling the retransmission of UE #1; and
    According to the predefined number of repetitions for blind detections K0 of 8, the base station continuously performs blind detections on the retransmission of the Msg3 PUSCH for 8 times from the time domain positions indicated by the DCI 0_0 scheduling the retransmission of UE #2.

Example 6

It is assumed that the legacy UE and the UE of the CE type are allocated with different PRACH resource sets, respectively (e.g., a PRACH resource set 1 is used by the legacy UE and a PRACH resource set 2 is used by the UE of the CE type), or allocated with different preamble format sets (e.g., a preamble format set 1 is used by the legacy UE and a preamble format set 2 is used by the UE of the CE type), or designated with different PRACH target powers (e.g., the PRACH target power 1 is used by the legacy UE and the PRACH target power 2 is used by the UE of the CE type), UE #1 is a legacy UE, and UE #2 is a UE of the CE type. The predefined number of repetitions for blind detections K0 is 8, the RSRP measured by UE #1 for the SSB is −5 dBm, and the RSRP measured by UE #2 for the SSB is −5 dBm, and it is assumed that the mapping relationship between the RSRP and the number of repetitions K, which is defined in advance or notified by the base station via broadcast information, is: the number of repetitions K corresponding to RSRP less than −10 dBm is 8, the number of repetitions K corresponding to RSRP between −10 dBm and 0 dBm is 4, the number of repetitions K corresponding to RSRP between 0 dBm and 10 dBm is 2, and the number of repetitions K corresponding to RSRP greater than 10 dBm is 1.

Then at UE Side:
  PRACH transmission
    when transmitting the PRACH, UE #1 uses the PRACH resources in the PRACH resource set 1, or uses the preamble formats in the preamble format set 1, or uses the PRACH target power 1 for PRACH power control;
    when transmitting the PRACH, UE #2 uses the PRACH resources in the PRACH resource set 2, or uses the preamble formats in the preamble format set 2, or uses the PRACH target power 2 for PRACH power control.
  First transmission of the Msg3 PUSCH
    UE #1 transmits the Msg3 PUSCH of the first transmission for one time according to the time domain positions of the Msg3 PUSCH indicated by the RAR; and
    UE #2 determines that the number of repetitions K for Msg3 PUSCH is 4 according to measurement result on SSB that the RSRP is of −5 dBm, and UE #2 continuously transmits the Msg3 PUSCH of the first transmission with 4 times from the time domain positions of the Msg3 PUSCH indicated by the RAR of UE #2.
  Retransmission of the Msg3 PUSCH
    UE #1 transmits the Msg3 PUSCH of the retransmission for one time according to the time domain positions indicated by the DCI 0_0 scheduling the retransmission;
    UE #2 determines that the number of repetitions K for the retransmission of the Msg3 PUSCH is 4 according to the number of repetitions for the first transmission of the Msg3 PUSCH, and UE #2 continuously transmits the Msg3 PUSCH of the retransmission with 4 times from the time domain positions indicated by the DCI 0_0 scheduling the retransmission.

At the Base Station Side:
  the base station determines the type of the UE according to the received PRACH.
    When it is found that the PRACH resources used by UE #1 belong to the PRACH resource set 1, or the preamble format set 1 is used, or the used PRACH power is within the range corresponding to the PRACH target power 1, UE #1 is considered to be a legacy UE;
    When it is found that the PRACH resources used by UE #2 belong to the PRACH resource set 2, or the preamble format set 2 is used, or the used PRACH power is within the range corresponding to the PRACH target power 2, UE #2 is considered to be a UE of the CE type.
  Reception for the first transmission of the Msg3 PUSCH by the base station
    The base station receives the Msg3 PUSCH of the first transmission for one time on the time domain positions of the Msg3 PUSCH indicated by the RAR of UE #1;
    According to the predefined number of repetitions for blind detections K0 of 8, the base station continuously performs blind detections on the first transmission of the Msg3 PUSCH for 8 times from the time domain positions of the Msg3 PUSCH indicated by the RAR of UE #2.
  Reception for the retransmission of the Msg3 PUSCH by the base station
    The base station receives the Msg3 PUSCH of the retransmission for one time on the time domain positions indicated by the DCI 0_0 scheduling the retransmission of UE #1;
    According to the predefined number of repetitions for blind detections K0 of 8, the base station continuously performs blind detections on the retransmission of the Msg3 PUSCH for 8 times from the time domain positions indicated by the DCI 0_0 scheduling the retransmission of UE #2.

Example 7-1

It is assumed that the base station may identify the legacy UE and the UE of the CE type according to the PRACH information, UE #1 is a legacy UE, UE #2 is a UE of the CE type, each of the CSI request fields in the RARs received by UE #1 and UE #2 indicates that the repetitions of the Msg3 PUSCH are enabled, and the number of repetitions K which is defined in advance or transmitted to the UE by the base station via broadcast information is 4.
Then at UE Side:
   First transmission of the Msg3 PUSCH
      UE #1 transmits the Msg3 PUSCH of the first transmission for one time according to the time domain positions of the Msg3 PUSCH indicated by the RAR;
      According to the number of repetitions K of 4 which is defined in advance or transmitted to the UE by the base station via broadcast information, UE #2 continuously transmits the Msg3 PUSCH of the first transmission with 4 times from the time domain positions of the Msg3 PUSCH indicated by the RAR.
   Retransmission of the Msg3 PUSCH
      UE #1 transmits the Msg3 PUSCH of the retransmission for one time according to the time domain positions indicated by the DCI 0_0 scheduling the retransmission;
      UE #2 determines that the number of repetitions K for the retransmission of the Msg3 PUSCH is 4 according to the number of repetitions for the first transmission of the Msg3 PUSCH of UE #2, and UE #2 continuously transmits the Msg3 PUSCH of the retransmission with 4 times from the time domain positions indicated by the DCI 0_0 scheduling the retransmission.
At the Base Station Side:
   Reception for the first transmission of the Msg3 PUSCH by the base station
      The base station receives the Msg3 PUSCH of the first transmission for one time on the time domain positions of the Msg3 PUSCH indicated by the RAR of UE #1;
      The base station receives the Msg3 PUSCH of the first transmission with 4 times from the time domain positions of the Msg3 PUSCH indicated by the RAR of UE #2.
   Reception for the retransmission of the Msg3 PUSCH by the base station
      The base station receives the Msg3 PUSCH of the retransmission for one time on the time domain positions indicated by the DCI 0_0 scheduling the retransmission of UE #1;
      The base station determines that the number of repetitions K for the retransmission of the Msg3 PUSCH is 4 according to the number of repetitions for the first transmission of the Msg3 PUSCH of UE #2, and the base station continuously receives the Msg3 PUSCH of the retransmission with 4 times from the time domain positions indicated by the DCI 0_0 scheduling the retransmission of UE #2.

Example 7-2

It is assumed that the base station may not identify the legacy UE and the UE of the CE type, UE #1 is a legacy UE, UE #2 is a UE of the CE type, each of the CSI request fields in the RARs received by UE #1 and UE #2 indicates that the repetitions of the Msg3 PUSCH are enabled, and the number of repetitions K which is defined in advance or transmitted to the UE by the base station via broadcast information is 4.
Then at UE Side:
   First transmission of the Msg3 PUSCH
      UE #1 transmits the Msg3 PUSCH of the first transmission for one time according to the time domain positions of the Msg3 PUSCH indicated by the RAR;
      According to the number of repetitions K of 4 which is defined in advance or transmitted to the UE by the base station via broadcast information, UE #2 continuously transmits the Msg3 PUSCH of the first transmission with 4 times from the time domain positions of the Msg3 PUSCH indicated by the RAR.
   Retransmission of the Msg3 PUSCH
      UE #1 transmits the Msg3 PUSCH of the retransmission for one time according to the time domain positions indicated by the DCI 0_0 scheduling the retransmission;
      UE #2 determines that the number of repetitions K for the retransmission of the Msg3 PUSCH is 4 according to the number of repetitions for the first transmission of the Msg3 PUSCH of UE #2, and UE #2 continuously transmits the Msg3 PUSCH of the retransmission with 4 times from the time domain positions indicated by the DCI 0_0 scheduling the retransmission.
At the Base Station Side:
   Reception for the first transmission of the Msg3 PUSCH by the base station
      The base station continuously performs blind detections on the first transmission of the Msg3 PUSCH with 4 times from the time domain positions of the Msg3 PUSCH indicated by the RAR of UE #1;
      The base station continuously performs blind detections on the first transmission of the Msg3 PUSCH with 4 times from the time domain positions of the Msg3 PUSCH indicated by the RAR of UE #2.
   Reception for the retransmission of the Msg3 PUSCH by the base station
      The base station performs blind detections on the retransmission of the Msg3 PUSCH with 4 times from the time domain positions indicated by the DCI 0_0 scheduling the retransmission of UE #1;
      The base station performs blind detections on the retransmission of the Msg3 PUSCH with 4 times from the time domain positions indicated by the DCI 0_0 scheduling the retransmission of UE #2.

Example 8

It is assumed that the base station may identify the legacy UE and the UE of the CE type according to the PRACH information, UE #1 is a legacy UE, UE #2 is a UE of the CE type, and the bit field indicating the number of repetitions for the Msg3 PUSCH in the RAR received by UE #1 and UE #2 indicates 4 from among a set of values {1,2,4,8} as the number of repetitions, wherein the set of values {1,2,4,8} is defined in advance or notified to the UE by the base station via broadcast information.
Then at UE Side:
   First transmission of the Msg3 PUSCH
      UE #1 transmits the Msg3 PUSCH of the first transmission for one time according to the time domain positions of the Msg3 PUSCH indicated by the RAR;

UE #2 continuously transmits the Msg3 PUSCH of the first transmission with 4 times from the time domain positions of the Msg3 PUSCH indicated by the RAR.

Retransmission of the Msg3 PUSCH

UE #1 transmits the Msg3 PUSCH of the retransmission for one time according to the time domain positions indicated by the DCI 0_0 scheduling the retransmission;

UE #2 determines that the number of repetitions K for the retransmission of the Msg3 PUSCH is 4 according to the number of repetitions for the first transmission of the Msg3 PUSCH of UE #2, and UE #2 continuously transmits the Msg3 PUSCH of the retransmission with 4 times from the time domain positions indicated by the DCI 0_0 scheduling the retransmission.

At the Base Station Side:

Reception for the first transmission of the Msg3 PUSCH by the base station

The base station receives the Msg3 PUSCH of the first transmission for one time on the time domain positions of the Msg3 PUSCH indicated by the RAR of UE #1;

The base station receives the Msg3 PUSCH of the first transmission with 4 times from the time domain positions of the Msg3 PUSCH indicated by the RAR of UE #2.

Reception for the retransmission of the Msg3 PUSCH by the base station

The base station receives the Msg3 PUSCH of the retransmission for one time on the time domain positions indicated by the DCI 0_0 scheduling the retransmission for UE #1;

The base station determines that the number of repetitions K for the retransmission of the Msg3 PUSCH is 4 according to the number of repetitions for the first transmission of the Msg3 PUSCH of UE #2, and the base station continuously receives the Msg3 PUSCH of the retransmission with 4 times from the time domain positions indicated by the DCI 0_0 scheduling the retransmission of UE #2.

Example 9

It is assumed that the base station may not identify the legacy UE and the UE of the CE type, UE #1 is a legacy UE, UE #2 is a UE of the CE type, and the bit field indicating the number of repetitions for the Msg3 PUSCH in the RAR received by UE #1 and UE #2 indicates 4 from among a set of values {1,2,4,8} as the number of repetitions, wherein the set of values {1,2,4,8} is defined in advance or notified to the UE by the base station via broadcast information.

Then at UE Side:

First transmission of the Msg3 PUSCH

UE #1 transmits the Msg3 PUSCH of the first transmission for one time according to the time domain positions of the Msg3 PUSCH indicated by the RAR;

UE #2 continuously transmits the Msg3 PUSCH of the first transmission with 4 times from the time domain positions of the Msg3 PUSCH indicated by the RAR.

Retransmission of the Msg3 PUSCH

UE #1 transmits the Msg3 PUSCH of the retransmission for one time according to the time domain positions indicated by the DCI 0_0 scheduling the retransmission;

UE #2 determines that the number of repetitions K for the retransmission of the Msg3 PUSCH is 4 according to the number of repetitions for the first transmission of the Msg3 PUSCH of UE #2, and UE #2 continuously transmits the Msg3 PUSCH of the retransmission with 4 times from the time domain positions indicated by the DCI 0_0 scheduling the retransmission.

At the Base Station Side:

Reception for the first transmission of the Msg3 PUSCH by the base station

The base station continuously performs blind detections on the first transmission of the Msg3 PUSCH with 4 times from the time domain positions of the Msg3 PUSCH indicated by the RAR of UE #1;

The base station continuously performs blind detections on the first transmission of the Msg3 PUSCH with 4 times from the time domain positions of the Msg3 PUSCH indicated by the RAR of UE #2.

Reception for the retransmission of the Msg3 PUSCH by the base station

The base station performs blind detections on the retransmission of the Msg3 PUSCH with 4 times from the time domain positions indicated by the DCI 0_0 scheduling the retransmission of UE #1;

The base station performs blind detections on the retransmission of the Msg3 PUSCH with 4 times from the time domain positions indicated by the DCI 0_0 scheduling the retransmission of UE #2.

Example 10

It is assumed that the base station may identify the legacy UE and the UE of the CE type, UE #1 is a legacy UE and UE #2 is a CE UE, and it is assumed that each of the numbers of repetitions corresponding to the sets to which the PRACH resources transmitted by UE #1 and UE #2 belong is 4, or the number of repetitions corresponding to the set to which the preamble format belongs is 4.

Then at UE side:

First transmission of the Msg3 PUSCH

UE #1 transmits the Msg3 PUSCH of the first transmission for one time according to the time domain positions of the Msg3 PUSCH indicated by the RAR;

UE #2 continuously transmits the Msg3 PUSCH of the first transmission with 4 times from the time domain positions of the Msg3 PUSCH indicated by the RAR.

Retransmission of the Msg3 PUSCH

UE #1 transmits the Msg3 PUSCH of the retransmission for one time according to the time domain positions indicated by the DCI 0_0 scheduling the retransmission;

UE #2 determines that the number of repetitions K for the retransmission of the Msg3 PUSCH is 4 according to the number of repetitions for the first transmission of the Msg3 PUSCH of UE #2, and UE #2 continuously transmits the Msg3 PUSCH of the retransmission with 4 times from the time domain positions indicated by the DCI 0_0 scheduling the retransmission.

At the Base Station Side:

the base station knows that UE #1 is a legacy UE, and only determines the number of repetitions for the Msg3 PUSCH of UE #2;

it is found that the number of repetitions for the Msg3 PUSCH corresponding to the PRACH resource set to which the PRACH resources used by UE #2 belong and the used preamble format set is 4.

Reception for the first transmission of the Msg3 PUSCH by the base station

The base station receives the Msg3 PUSCH of the first transmission for one time on the time domain positions of the Msg3 PUSCH indicated by the RAR of UE #1;

The base station receives the Msg3 PUSCH of the first transmission with 4 times from the time domain positions of the Msg3 PUSCH indicated by the RAR of UE #2.

Reception for the retransmission of the Msg3 PUSCH by the base station

The base station receives the Msg3 PUSCH of the retransmission for onetime on the time domain positions indicated by the DCI 0_0 scheduling the retransmission of UE #1;

The base station determines that the number of repetitions K for the retransmission of the Msg3 PUSCH is 4 according to the number of repetitions for the first transmission of the Msg3 PUSCH of UE #2, and the base station continuously receives the Msg3 PUSCH of the retransmission with 4 times from the time domain positions indicated by the DCI 0_0 scheduling the retransmission of UE #2.

Example 11

It is assumed that the base station may not identify the legacy UE and the UE of the CE type, UE #1 is a legacy UE and UE #2 is a CE UE, and it is assumed that each of the numbers of repetitions corresponding to the set 1 to which the PRACH resources transmitted by UE #1 and UE #2 belong is 4, or the number of repetitions corresponding to the set to which the preamble format belongs is 4.

Then at UE Side:

First transmission of the Msg3 PUSCH

UE #1 transmits the Msg3 PUSCH of the first transmission for one time according to the time domain positions of the Msg3 PUSCH indicated by the RAR;

UE #2 continuously transmits the Msg3 PUSCH of the first transmission with 4 times from the time domain positions of the Msg3 PUSCH indicated by the RAR.

Retransmission of the Msg3 PUSCH

UE #1 transmits the Msg3 PUSCH of the retransmission for one time according to the time domain positions indicated by the DCI 0_0 scheduling the retransmission;

UE #2 determines that the number of repetitions K for the retransmission of the Msg3 PUSCH is 4 according to the number of repetitions for the first transmission of the Msg3 PUSCH of UE #2, and UE #2 continuously transmits the Msg3 PUSCH of the retransmission with 4 times from the time domain positions indicated by the DCI 0_0 scheduling the retransmission.

At the Base Station Side:

the base station determines that the number of repetitions for the Msg3 PUSCH corresponding to the PRACH resource set to which the PRACH resources of UE #1 and UE #2 belong and the used preamble format set is 4.

Reception for the first transmission of the Msg3 PUSCH by the base station

The base station performs blind detections on the first transmission of the Msg3 PUSCH with 4 times from the time domain positions of the Msg3 PUSCH indicated by the RAR of UE #1;

The base station performs blind detections on the first transmission of the Msg3 PUSCH with 4 times from the time domain positions of the Msg3 PUSCH indicated by the RAR of UE #2.

Reception for the retransmission of the Msg3 PUSCH by the base station

The base station performs blind detections on the first transmission of the Msg3 PUSCH with 4 times from the time domain positions indicated by the DCI 0_0 scheduling the retransmission of UE #1;

The base station performs blind detections on the first transmission of the Msg3 PUSCH with 4 times from the time domain positions indicated by the DCI 0_0 scheduling the retransmission of UE #2.

Figure 4:
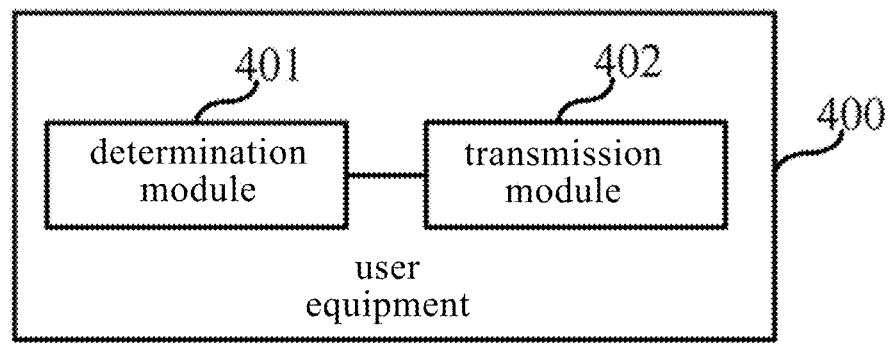
FIG. 4 is basic structural schematic diagram of a user equipment according to another embodiment of the present disclosure.

FIG. 4 is a structural schematic diagram of a user equipment according to still another embodiment of the present disclosure. As shown in FIG. 4, the user equipment 400 may include a determination module 401 and a transmission module 402.

The determination module 401 is configured to determine a number of repetitions of a physical uplink shared channel (PUSCH), wherein the PUSCH is a PUSCH of Msg3 in a random access procedure and the number of repetitions is a positive integer; and The transmission module 402 is configured to transmit the PUSCH to a network device with the number of repetitions.

In one possible implementation, the determination module is configured to determine a first number of repetitions for first transmission of the PUSCH; and/or to determine a second number of repetitions for the retransmission of the PUSCH; and the transmission module is configured to transmit the PUSCH of the first transmission to the network device with the first number of repetitions; and/or, to transmit the PUSCH of the retransmission to the network device with the second number of repetitions.

In one possible implementation, when determining the first number of repetitions for the first transmission of the PUSCH, the determination module is configured to perform any one of the following:

determining, based on first indication information in a predetermined indication field in a received random access response (RAR), the first number of repetitions for the first transmission of the PUSCH;

determining, based on a downlink measurement result and a mapping relationship between the downlink measurement result and the number of repetitions, the first number of repetitions for the first transmission of the PUSCH; and determining, based on predetermined information in the transmitted physical random access channel (PRACH) and a mapping relationship between the predetermined information and the number of repetitions, the first number of repetitions for the first transmission of the PUSCH, wherein the predetermined information includes a set to which PRACH resources belong and a set to which a preamble format belongs.

In one possible implementation, the predetermined indication field in the RAR includes any one of the following: a modulation and coding scheme (MCS) indication field; a timing advance (TA) indication field; an idle bit field; or a newly added indication field for the number of repetitions.

In one possible implementation, when the predetermined indication field includes the MCS indication field, the first indication information is index information of the MCS; wherein when determining, based on first indication information in the predetermined indication field in the RAR, the first number of repetitions for the first transmission of the PUSCH, the determination module is configured to determine, based on the index information of the MCS and a mapping relationship between the index information of the MCS and the number of repetitions, the first number of repetitions for the first transmission of the PUSCH; wherein the mapping relationship between the index information of the MCS and the number of repetitions is a mapping relationship which is defined in advance or received and indicated by the network device via broadcast.

When the predetermined indication field includes the TA indication field, the first indication information is a TA value; wherein when determining, based on the first indication information in the predetermined indication field in the RAR, the first number of repetitions for the first transmission of the PUSCH, the determination module is configured to determine, based on the TA value and a mapping relationship between the TA value and the number of repetitions, the first number of repetitions for the first transmission of the PUSCH; wherein the mapping relationship between the TA value and the number of repetitions is a mapping relationship which is defined in advance or received and indicated by the network device via broadcast.

When the predetermined indication field includes the idle bit field, the first indication information is indication information indicating whether the repetitions are enabled for the PUSCH of Msg3 or not; wherein when determining, based on the first indication information in the predetermined indication field in the RAR, the first number of repetitions for the first transmission of the PUSCH, the determination module is configured to determine, based on the indication information indicating whether the repetitions are enabled for the PUSCH of Msg3 or not, the first number of repetitions for the first transmission of the PUSCH; wherein if the idle bit field indicates that the repetitions are enabled for the PUSCH of Msg3, the first number of repetitions for the first transmission of the PUSCH is a number of repetitions which is defined in advance or received and indicated by the network device via broadcast; and if the idle bit field indicates that the repetitions are not enabled for the PUSCH of Msg3, the first number of repetitions for the first transmission of the PUSCH is 1.

When the predetermined indication field includes the newly added indication field for the number of repetitions, the first indication information is index information for indicating any one of a set of numeric values representing the number of repetitions; wherein when determining, based on the first indication information in the predetermined indication field in the RAR, the first number of repetitions for the first transmission of the PUSCH, the determination module is configured to determine, based on the index information for indicating any one of the set of numeric values representing the number of repetitions, the first number of repetitions for the first transmission of the PUSCH; wherein the set of numeric values representing the number of repetitions is a set of numeric values which is defined in advance or received and indicated by the network device via broadcast.

In one possible implementation, when determining the second number of repetitions for the retransmission of the PUSCH, the determination module is configured to perform any one of the following:

determining, based on second indication information in the predetermined indication field in a predetermined format in downlink control information (DCI) and a mapping relationship between the second indication information and the number of repetitions, the second number of repetitions for the retransmission of the PUSCH; and determining, based on the first number of repetitions for the first transmission of the PUSCH, the second number of repetitions for the retransmission of the PUSCH.

It will be understood that the structure of the user equipment 400 shown in FIG. 4 is only illustrative and the disclosure is not limited to thereto.

In one possible implementation, the user equipment further includes a first processing module. The first processing module is configured to obtain a preset repetition type of the PUSCH, or receive a repetition type of the PUSCH which is indicated by the network device via broadcast; and determine, based on the repetition type of the PUSCH, time domain resources for the repetitions of the PUSCH.

When transmitting the PUSCH to the network device with the number of repetitions, the transmission module is configured to transmit, according to the time domain resources of the PUSCH, the PUSCH to the network device with the number of repetitions.

In one possible implementation, the user equipment further includes a second processing module. The second processing module is configured to determine first initial time domain resources for the first transmission of the PUSCH indicated by the RAR, or determining second initial time domain resources for the retransmission of the PUSCH indicated by the predetermined format of the DCI.

Before the determining, based on the repetition type of the PUSCH, time domain resources for the repetitions of the PUSCH, the first processing module is configured to determine, according to the repetition type of the PUSCH, the first initial time domain resources and the first number of repetitions for the first transmission of the PUSCH, the time domain resources for the first transmission of the PUSCH with the first number of repetitions; or, to determine, according to the repetition type of the PUSCH, the second initial time domain resources and the second number of repetitions for the retransmission of the PUSCH, the time domain resources for the retransmission of the PUSCH with the second number of repetitions.

When transmitting, according to the time domain resources for the PUSCH, the PUSCH to the network device with the number of repetitions, the transmission module is configured to transmit, according to the time domain resources for the first transmission of the PUSCH with the first number of repetitions, the PUSCH of the first transmission to the network device with the first number of repetitions; or, to transmit, according to the time domain resources for the retransmission of the PUSCH with the second number of repetitions, the PUSCH of the retransmission to the network device with the second number of repetitions.

In one possible implementation, a user equipment (UE) is a UE of a first type or a UE of a second type; wherein when the UE is a UE of the first type, the first number of repetitions for the first transmission of the PUSCH is directly determined to be 1 and the time domain resources of the PUSCH are the first initial time domain resources;

when the UE is a UE of the first type, the second number of repetitions for the retransmission of the PUSCH is directly determined to be 1 and the time domain resources of the PUSCH are the second initial time domain resources;

when the UE is a UE of the second type, the first number of repetitions for the first transmission of the PUSCH is an integer number not less than 1, and the time domain resources of the PUSCH are determined according to the repetition type of the PUSCH, the first initial time domain resources and the first number of repetitions for the first transmission of the PUSCH; and when the UE is a UE of the second type, the second number of repetitions for the retransmission of the PUSCH is an integer number not less than 1, and the time domain resources of the PUSCH are determined according to the repetition type of the PUSCH, the second initial time domain resources and the second number of repetitions for the retransmission of the PUSCH.

By using the user equipment provided by the embodiment of the present disclosure, the user equipment may determine a number of repetitions for a Msg3 PUSCH (a PUSCH of Msg3), thus providing a solution for supporting the repetitions of Msg3 PUSCH and solving a critical technical problem of uplink coverage enhancement, and improving the uplink coverage range of the Msg3 PUSCH greatly.

It should be noted that the present embodiment may be a product embodiment corresponding to the forgoing method embodiment at the user equipment side, and the present embodiment may be implemented in coordination with the forgoing method embodiment at the user equipment side. The relevant technical details regarding the forgoing method embodiment at the user equipment side apply to the present embodiment and will not be repeated here to avoid redundancy. Accordingly, the relevant technical details regarding the present embodiment may also apply to the forgoing method embodiment at the user equipment side.

Figure 5:
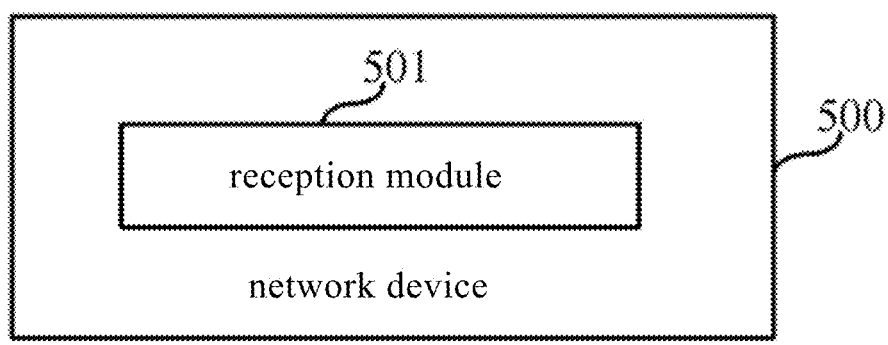
FIG. 5 is basic structural schematic diagram of a network device according to another embodiment of the present disclosure.

FIG. 5 is a structural schematic diagram of a network device according to still another embodiment of the present disclosure. As shown in FIG. 5, the network device 500 may include a reception module 501. The reception module is configured to receive a PUSCH transmitted by a user equipment (UE) with a number of repetitions, wherein the PUSCH is a PUSCH of Msg3 in a random access procedure.

In one possible implementation, the reception module is configured to receive the PUSCH of first transmission transmitted by the UE with a first number of repetitions; and/or to receive the PUSCH of retransmission transmitted by the UE with a second number of repetitions.

It will be understood that the structure of the network device 500 shown in FIG. 5 is only illustrative and the disclosure is not limited to thereto.

In one possible implementation, the network device further includes a first processing module. The first processing module is configured to obtain a repetition type of the PUSCH which is set in advance or transmitted by the network device via broadcast, and determine, based on the repetition type of the PUSCH, time domain resources for the transmission of the PUSCH.

The reception module is configured to receive, according to the time domain resources of the PUSCH, the PUSCH transmitted by UE with the number of repetitions.

In one possible implementation, the network device further includes a determination module. The determination module is configured to determine first initial time domain resources for the first transmission of the PUSCH indicated by a RAR, or, to determine second initial time domain resources for the retransmission of the PUSCH indicated by a predetermined format of a DCI.

When determining, based on the repetition type of the PUSCH, the time domain resources for the transmission of the PUSCH, the first processing module is configured to determine, according to the repetition type of the PUSCH and the first initial time domain resources, the time domain resources for the first transmission of the PUSCH with the first number of repetitions; or, to determine, according to the repetition type of the PUSCH and the second initial time domain resources, the time domain resources for the retransmission of the PUSCH with the second number of repetitions.

When receiving, according to the time domain resources of the PUSCH, the PUSCH transmitted by the UE with the number of repetitions, the reception module is configured to receive, according to the time domain resources for the first transmission of the PUSCH with the first number of repetitions, the PUSCH of the first transmission transmitted by the UE with the first number of repetitions; or, to receive, according to time domain resources for the retransmission of the PUSCH with the second number of repetitions, the PUSCH of the retransmission transmitted by the UE with the second number of repetitions.

In one possible implementation, a UE includes a UE of a first type or a UE of a second type; wherein when the network device is capable of determining that the UE is a UE of the first type or a UE of the second type, when receiving the PUSCH of the first transmission transmitted by the UE with the first number of repetitions, the reception module is configured to for the UE of the first type, receive the PUSCH of the first transmission for one time on the first initial time domain resources for the first transmission of the PUSCH w indicated by the RAR; and for the UE of the second type, continuously receive, according to the repetition type of the PUSCH and the first initial time domain resources for the first transmission of the PUSCH indicated by the RAR, the PUSCH of the first transmission with the first number of repetitions, or receive the PUSCH of the first transmission with the first number of repetitions through blind detections;

when receiving the PUSCH of the retransmission transmitted by the UE with the second number of repetitions, the reception module is configured to for the UE of the first type, receive the PUSCH of the retransmission for one time on the second initial time domain resources for the retransmission of the PUSCH indicated by the predetermined format of the DCI; and for the UE of the second type, continuously receive, according to the repetition type of the PUSCH and the second initial time domain resources for the retransmission of the PUSCH indicated by the predetermined format of the DCI, the PUSCH of the retransmission with the second number of repetitions, or receive the PUSCH of the retransmission with the second number of repetitions through the blind detections.

In one possible implementation, when for the UE of the second type, continuously receiving, according to the repetition type of the PUSCH and the first initial time domain resources for the first transmission of the PUSCH indicated by the RAR, the PUSCH of the first transmission with the first number of repetitions, or receiving the PUSCH of the first transmission with the first number of repetitions through the blind detections, the reception module is configured to if the network device is capable of determining the first number of repetitions according to any one of the following ways, continuously receive, according to the time domain resources for the first transmission of the PUSCH with the first number of repetitions, the PUSCH of the first transmission with the first number of repetitions; wherein the time domain resources for the first transmission of the PUSCH with the first number of repetitions are determined according to the repetition type of the PUSCH, the first initial time domain resources and the first number of repetitions; wherein the ways for determining the first number of repetitions includes:

first indication information in a predetermined indication field in the transmitted RAR;

predetermined information in the received PRACH, and a mapping relationship between the predetermined information and the number of repetitions, wherein the predetermined information includes a set to which PRACH resources belong and a set to which a preamble format belongs;

if the network device is not capable of determining the first number of repetitions, receive the PUSCH of the first transmission with the first number of repetitions by performing the blind detections on the PUSCH of the first transmission for a first predetermined number of blind detections according to the repetition type of the PUSCH and the first initial time domain resources for the first transmission of the PUSCH indicated by the RAR; wherein the first predetermined number of blind detections is an integer number greater than or equal to the first number of repetitions, and the first predetermined number of blind detections is defined in advance.

In one possible implementation, when for the UE of the second type, continuously receiving, according to the repetition type of the PUSCH and the second initial time domain resources for the retransmission of the PUSCH indicated by the predetermined format of the DCI, the PUSCH of the retransmission with the second number of repetitions, or receiving the PUSCH of the retransmission with the second number of repetitions through the blind detections, the reception module is configured to:

if the network device is capable of determining the second number of repetitions according to any one of the following ways, continuously receive, according to the time domain resources for the retransmission of the PUSCH with the second number of repetitions, the PUSCH of the retransmission with the second number of repetitions; wherein the time domain resources for the retransmission of the PUSCH with the second number of repetitions are determined according to the repetition type of the PUSCH, the second initial time domain resources for the retransmission of the PUSCH indicated by the predetermined format of the DCI and the second number of repetitions; wherein the ways for determining the second number of repetitions includes:

second indication information in a predetermined indication field in a predetermined format in a downlink DCI; and the first number of repetitions for the first transmission of the PUSCH;

if the network device is not capable of determining the second number of repetitions, receive the PUSCH of the retransmission with the second number of repetitions by performing the blind detections on the PUSCH of the retransmission for a second predetermined number of blind detections according to the repetition type of the PUSCH and the second initial time domain resources for the retransmission of the PUSCH indicated by the predetermined format of the DCI; wherein the second predetermined number of blind detections is an integer number greater than or equal to the second number of repetitions and the second predetermined number of blind detections is defined in advance.

In one possible implementation, a UE includes a UE of a first type or a UE of a second type; wherein when the network device is not capable of determining that the UE is a UE of the first type or a UE of the second type, when receiving the PUSCH of the first transmission transmitted by the UE with the first number of repetitions, the reception module is configured to for a UE of the first type or a UE of the second type, receive, through the blind detections according to the repetition type of the PUSCH and the first initial time domain resources for the first transmission of the PUSCH indicated by the RAR, the PUSCH of the first transmission with the first number of repetitions;

when receiving the PUSCH of the retransmission transmitted by the UE with the second number of repetitions, the reception module is configured to for a UE of the first type or a UE of the second type, receive, through the blind detections, according to the repetition type of the PUSCH and the second initial time domain resources for the retransmission of the PUSCH indicated by the predetermined format of the DCI, the PUSCH of the retransmission with the second number of repetitions.

In one possible implementation, when receiving, through the blind detections according to the repetition type of the PUSCH and the first initial time domain resources for the first transmission of the PUSCH indicated by the RAR, the PUSCH of the first transmission with the first number of repetitions, the reception module is configured to:

if the network device is capable of determining the first number of repetitions according to any one of the following ways, receive the PUSCH of the first transmission with the first number of repetitions by performing the blind detections on the PUSCH of the first transmission with the first number of repetitions according to the repetition type of the PUSCH and the first initial time domain resources for the first transmission of the PUSCH indicated by the RAR, the ways for determining the first number of repetitions includes:

first indication information in a predetermined indication field in a transmitted RAR; and predetermined information in the received PRACH, and a mapping relationship between the predetermined information and the number of repetitions, wherein the predetermined information includes a set to which PRACH resources belong and a set to which a preamble format belongs; and if the network device is not capable of determining the first number of repetitions, receive the PUSCH of the first transmission with the first number of repetitions by performing the blind detections on the PUSCH of the first transmission for a third predetermined number of blind detections according to the repetition type of the PUSCH and the first initial time domain resources for the first transmission of the PUSCH indicated by the RAR; wherein the third predetermined number of blind detections is an integer number greater than or equal to the first number of repetitions, and the third predetermined number of blind detections is defined in advance.

In one possible implementation, when receiving, through the blind detections, according to the repetition type of the PUSCH and the second initial time domain resources for the retransmission of the PUSCH indicated by the predetermined format of the DCI, the PUSCH of the retransmission with the second number of repetitions, the reception module is configured to:

if the network device is capable of determining the second number of repetitions according to any one of the following ways, receive the PUSCH of the retransmission with the second number of repetitions by performing the blind detections on the PUSCH of the retransmission with the second number of repetitions according to the repetition type of the PUSCH and the second initial time domain resources for the retransmission of the PUSCH indicated by the predetermined format of the DCI, the ways for determining the second number of repetitions includes:

second indication information in a predetermined indication field in a predetermined format in a downlink DCI; and the first number of repetitions for the first transmission of the PUSCH;

if the network device is not capable of determining the second number of repetitions, receive the PUSCH of the retransmission with the second number of repetitions by performing the blind detections on the PUSCH of the retransmission for a fourth predetermined number of blind detections according to the repetition type of the PUSCH and the second initial time domain resources for the retransmission of the PUSCH indicated by the predetermined format of the DCI; wherein the fourth predetermined number of blind detections is an integer number greater than or equal to the second number of repetitions and the fourth predetermined number of blind detections is defined in advance.

In one possible implementation, whether being capable of determining the UE is a UE of the first type or a UE of the second type is determined by the network device according to the predetermined information in the PRACH transmitted by the UE;

wherein the predetermined information includes any one of the following: a set to which PRACH resources belong; a set to which a preamble format belongs to; and PRACH target power.

In one possible implementation, the predetermined indication field in the RAR includes any one of the following: a modulation and coding scheme (MCS) indication field; a timing advance (TA) indication field; an idle bit field; or a newly added indication field for the number of repetitions.

By using the network device provided by the embodiment of the present disclosure, the network device may receive a Msg3 PUSCH (a PUSCH of Msg3) with a number of repetitions, thus the number of repetitions for the Msg3 PUSCH may be determined, a solution for supporting the repetitions of Msg3 PUSCH is provided so as to solve a critical technical problem of uplink coverage enhancement, and improve the uplink coverage range of the Msg3 PUSCH greatly.

It should be noted that the present embodiment may be a product embodiment corresponding to the forgoing method embodiment at the network device side, and the present embodiment may be implemented in coordination with the forgoing method embodiment at the network device side. The relevant technical details regarding the forgoing method embodiment at the network device side apply to the present embodiment and will not be repeated here to avoid redundancy. Accordingly, the relevant technical details regarding the present embodiment may also apply to the forgoing method embodiment at the network device side.

Figure 6:
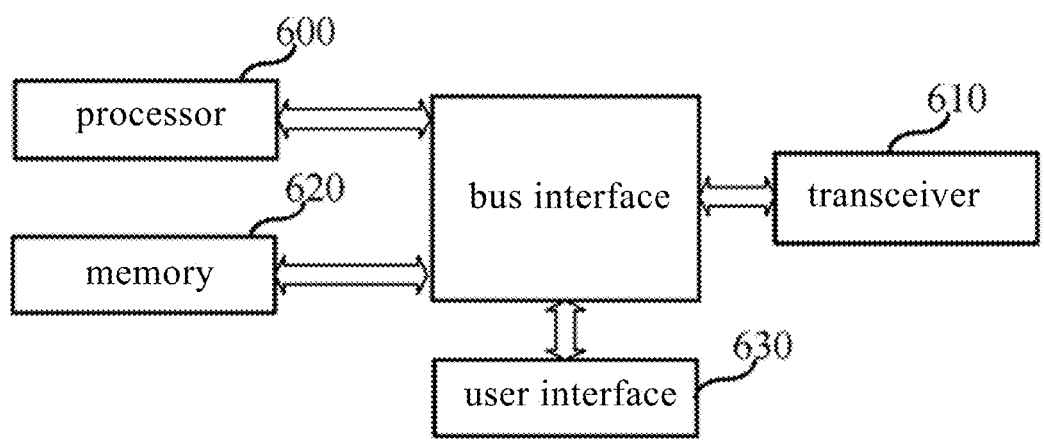
FIG. 6 is a structural schematic diagram of a user equipment according to still another embodiment of the present disclosure.

According to another embodiment of the present disclosure, there is provided a user equipment. As shown in FIG. 6, the user equipment includes a processor 600, a memory 620, a user interface 630 and a transceiver 610. The transceiver 610 is configured to receive and transmit data under the control of the processor 600.

In FIG. 6, the bus architecture may include any number of interconnected buses and bridges and is specifically configured to link various circuits including one or more processors represented by the processor 600 and a memory represented by the memory 620. The bus architecture may also link various other circuits such as a peripheral device, a voltage regulator and a power management circuit, which are well known in the art and thus will not be further described herein. A bus interface provides an interface. The transceiver 610 may be a plurality of elements, i.e., including a transmitter and a receiver, which provides a unit for communicating with various other devices over transmission medias including a wireless channel, a wired channel and optical cable and the like. For different user equipments, the user interface 630 may also be an interface for connecting the required devices externally and internally, and the connected devices include, but not limited to, a keypad, a display, a speaker, a microphone and joystick and the like.

The processor 600 is responsible for managing the bus architecture and the general process, and the memory 620 may store the data to be used when the processor 600 performing an operation.

Optionally, the processor 600 may be a central processing unit (CPU), an application-specific integrated circuit (ASIC), a field programmable gate array (FPGA) and a complex programmable logic device (CPLD), and the processor may also uses a multi-core architecture.

By invoking the computer programs stored by the memory, the processor is configured to perform any of the methods according to embodiments of the present disclosure according to the acquired executable instructions. The processor and the memory may be arranged to be physically separated with each other.

The memory 620 is configured to store the application codes for executing the scheme of the present disclosure, and the execution is controlled by the processor 601. The processor 600 is configured to execute the application codes stored in the memory 620 to implement the actions of the user equipment in the embodiment of FIG. 4.

Figure 7:
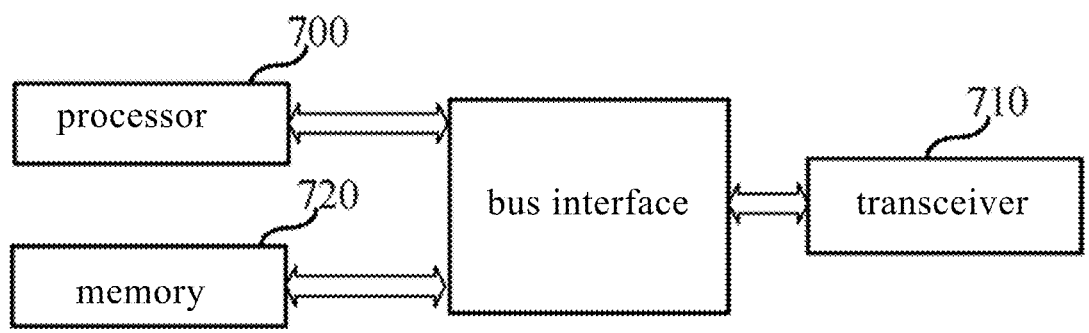
FIG. 7 is a structural schematic diagram of a network device according to still another embodiment of the present disclosure.

According to another embodiment of the present disclosure, there is provided a user equipment. As shown in FIG. 7, the user equipment includes a processor 700, a memory 720 and a transceiver 710. The transceiver 710 is configured to receive and transmit data under the control of the processor 700.

In FIG. 7, the bus architecture may include any number of interconnected buses and bridges and is specifically configured to link various circuits including one or more processors represented by the processor 700 and a memory represented by the memory 720. The bus architecture may also link various other circuits such as a peripheral device, a voltage regulator and a power management circuit, which are well known in the art and thus will not be further described herein. A bus interface provides an interface. The transceiver 710 may be a plurality of elements, i.e., including a transmitter and a receiver, which provides a unit for communicating with various other devices over transmission medias including a wireless channel, a wired channel and optical cable and the like. The processor 700 is responsible for managing the bus architecture and the general process, and the memory 720 may store the data to be used when the processor 700 performing an operation.

The processor 700 may be a central processing unit (CPU), an application-specific integrated circuit (ASIC), a field programmable gate array (FPGA) and a complex programmable logic device (CPLD), and the processor may also use a multi-core architecture.

According to yet another embodiment of the present disclosure, there is provided a computer program product or computer program including computer instructions that are store in a computer readable storage medium. The processor of a computer device reads computer instructions from the computer readable storage medium and executes the computer instructions, so that the forgoing methods provided in various implementations of the user equipment side or the network device side may be executed by the computer device. That is, the computer readable storage medium according to embodiments of the present disclosure is applicable to any of the embodiments in the foregoing methods. A processor readable storage medium may be any available medias or data storage devices that may be accessed by the processor, including but not limited to, a magnetic memory (e.g., a floppy disk, a hard disk, a tape and a magneto optical disk (MO) etc.), optical storage (e.g., a CD, a DVD, a BD, and a HVD), and a semiconductor memory (e.g., a ROM, a EPROM, a EEPROM, a non-volatile memory (NAND FLASH) and a solid state hard drive (SSD)) and the like.

It should be understood that, although various steps in the flowcharts of the drawings are shown in sequence as indicated by arrows, these steps are not necessary to be executed in sequence according to the order indicated by arrows. Unless explicitly stated herein, there are no strict limitations on the order of execution for those steps, and those steps may be executed in other orders. Also, at least part of the steps in the flowcharts of the drawings may include a plurality of sub-steps or a plurality of stages, and these sub-steps or stages are not necessary to be executed and finished at the same moments but may be executed at different moments. The execution order of these sub-steps or stages is not necessarily to be performed in sequence but may be executed by turns or alternately with other steps or the sub-steps of other steps or at least part of the stages.

The descriptions herein above are only part of embodiments of the present disclosure. It should be noted that, for a person of ordinary skill in the art, several improvements and modifications may be made without departing from the principle of the present disclosure, and these improvements and modifications should also be regarded as the scope of the present disclosure.

What is claimed is:
1. A communication method, comprising:
determining a number of repetitions of a physical uplink shared channel (PUSCH), wherein the PUSCH is a PUSCH of Msg3 in a random access procedure and the number of repetitions is a positive integer; and
transmitting the PUSCH to a network device with the number of repetitions,
wherein the determining the number of repetitions of the PUSCH comprising: determining a first number of repetitions for first transmission of the PUSCH,
wherein the transmitting the PUSCH to the network device with the number of repetitions comprising: transmitting the PUSCH of the first transmission to the network device with the first number of repetitions,
wherein the determining the first number of repetitions for the first transmission of the PUSCH comprising: determining, based on first indication information in a predetermined indication field in a received random access response (RAR), the first number of repetitions for the first transmission of the PUSCH,
wherein the predetermined indication field in the RAR comprising any one of: a modulation and coding scheme (MCS) indication field; a timing advance (TA) indication field; an idle bit field; or a newly added indication field for the number of repetitions,
wherein when the predetermined indication field includes the MCS indication field, the first indication information is index information of the MCS; wherein the determining, based on the first indication information in the predetermined indication field in the RAR, the first number of repetitions for the first transmission of the PUSCH includes: determining, based on the index information of the MCS and a mapping relationship between the index information of the MCS and the number of repetitions, the first number of repetitions for the first transmission of the PUSCH; wherein the mapping relationship between the index information of the MCS and the number of repetitions is a mapping relationship which is defined in advance or received and indicated by the network device via broadcast:
wherein when the predetermined indication field includes the TA indication field, the first indication information is a TA value; wherein the determining, based on the first indication information in the predetermined indication field in the RAR, the first number of repetitions for the first transmission of the PUSCH includes: determining, based on the TA value and a mapping relationship between the TA value and the number of repetitions, the first number of repetitions for the first transmission of the PUSCH; wherein the mapping relationship between the TA value and the number of repetitions is a mapping relationship which is defined in advance or received and indicated by the network device via broadcast;
wherein when the predetermined indication field includes the idle bit field, the first indication information is indication information indicating whether the repetitions are enabled for the PUSCH of Msg3 or not; wherein the determining, based on the first indication information in the predetermined indication field in the RAR, the first number of repetitions for the first transmission of the PUSCH includes: determining, based on the indication information indicating whether the repetitions are enabled for the PUSCH of Msg3 or not, the first number of repetitions for the first transmission of the PUSCH; wherein if the idle bit field indicates that the repetitions are enabled for the PUSCH of Msg3, the first number of repetitions for the first transmission of the PUSCH is a number of repetitions which is defined in advance or received and indicated by the network device via broadcast; and if the idle bit field indicates that the repetitions are not enabled for the PUSCH of Msg3, the first number of repetitions for the first transmission of the PUSCH is 1;
when the predetermined indication field includes the newly added indication field for the number of repetitions, the first indication information is index information for indicating any one of a set of numeric values representing the number of repetitions; wherein the determining, based on the first indication information in the predetermined indication field in the RAR, the first number of repetitions for the first transmission of the PUSCH includes: determining, based on the index information for indicating any one of the set of numeric values representing the number of repetitions, the first number of repetitions for the first transmission of the PUSCH; wherein the set of numeric values represent- ing the number of repetitions is a set of numeric values which is defined in advance or received and indicated by the network device via broadcast.

2. The method according to claim 1, wherein the determining the number of repetitions of the PUSCH further comprising:
determining a second number of repetitions for retransmission of the PUSCH;
wherein the transmitting the PUSCH to the network device with the number of repetitions further comprising:
transmitting the PUSCH of the retransmission to the network device with the second number of repetitions.

3. The method according to claim 2, wherein the determining the second number of repetitions for the retransmission of the PUSCH includes any one of:
determining, based on second indication information in a predetermined indication field in a predetermined format in downlink control information (DCI) and a mapping relationship between the second indication information and the number of repetitions, the second number of repetitions for the retransmission of the PUSCH;
determining, based on the first number of repetitions for the first transmission of the PUSCH, the second number of repetitions for the retransmission of the PUSCH.

4. The method according to claim 2, wherein the determining the second number of repetitions for the retransmission of the PUSCH includes any one of: determining, based on second indication information in a predetermined indication field in a predetermined format in downlink control information (DCD and a mapping relationship between the second indication information and the number of repetitions, the second number of repetitions for the retransmission of the PUSCH; determining, based on the first number of repetitions for the first transmission of the PUSCH, the second number of repetitions for the retransmission of the PUSCH.

5. The method according to claim 4, wherein the determining the second number of repetitions for the retransmission of the PUSCH includes any one of: determining, based on second indication information in a predetermined indication field in a predetermined format in downlink control information (DCD and a mapping relationship between the second indication information and the number of repetitions, the second number of repetitions for the retransmission of the PUSCH; determining, based on the first number of repetitions for the first transmission of the PUSCH, the second number of repetitions for the retransmission of the PUSCH.

6. The method according to claim 5, wherein the determining the second number of repetitions for the retransmission of the PUSCH includes any one of: determining, based on second indication information in a predetermined indication field in a predetermined format in downlink control information (DCD and a mapping relationship between the second indication information and the number of repetitions, the second number of repetitions for the retransmission of the PUSCH; determining, based on the first number of repetitions for the first transmission of the PUSCH, the second number of repetitions for the retransmission of the PUSCH.

7. The method according to claim 1, wherein before the transmitting the PUSCH to the network device with the number of repetitions, the method further comprising:
obtaining a preset repetition type of the PUSCH, or receiving a repetition type of the PUSCH which is indicated by the network device via broadcast; and
determining, based on the repetition type of the PUSCH, time domain resources for the repetitions of the PUSCH,
wherein the transmitting the PUSCH to the network device with the number of repetitions comprising:
transmitting, according to the time domain resources of the PUSCH, the PUSCH to the network device with the number of repetitions.

8. The method according to claim 7, wherein before the determining, based on the repetition type of the PUSCH, the time domain resources for the repetitions of the PUSCH, the method further comprising:
determining first initial time domain resources for the first transmission of the PUSCH indicated by the RAR, or determining second initial time domain resources for the retransmission of the PUSCH indicated by the predetermined format of the DCI;
wherein the determining, based on the repetition type of the PUSCH, the time domain resources for the repetitions of the PUSCH comprising:
determining, according to the repetition type of the PUSCH, the first initial time domain resources and the first number of repetitions for the first transmission of the PUSCH, the time domain resources for the first transmission of the PUSCH with the first number of repetitions; or,
determining, according to the repetition type of the PUSCH, the second initial time domain resources and the second number of repetitions for the retransmission of the PUSCH, the time domain resources for the retransmission of the PUSCH with the second number of repetitions;
wherein the transmitting, according to the time domain resources of the PUSCH, the PUSCH to the network device with the number of repetitions comprising:
transmitting, according to the time domain resources for the first transmission of the PUSCH with the first number of repetitions, the PUSCH of the first transmission to the network device with the first number of repetitions; or,
transmitting, according to the time domain resources for the retransmission of the PUSCH with the second number of repetitions, the PUSCH of the retransmission to the network device with the second number of repetitions.

9. The method according to claim 8, wherein a user equipment (UE) is a UE of a first type or a UE of a second type;
when the UE is a UE of the first type, the first number of repetitions for the first transmission of the PUSCH is directly determined to be 1 and the time domain resources of the PUSCH are the first initial time domain resources;
when the UE is a UE of the first type, the second number of repetitions for the retransmission of the PUSCH is directly determined to be 1 and the time domain resources of the PUSCH are the second initial time domain resources;
when the UE is a UE of the second type, the first number of repetitions for the first transmission of the PUSCH is an integer number not less than 1, and the time domain resources of the PUSCH are determined according to the repetition type of the PUSCH, the first initial time domain resources and the first number of repetitions for the first transmission of the PUSCH;

when the UE is a UE of the second type, the second number of repetitions for the retransmission of the PUSCH is an integer number not less than 1, and the time domain resources of the PUSCH are determined according to the repetition type of the PUSCH, the second initial time domain resources and the second number of repetitions for the retransmission of the PUSCH.

10. A communication method, comprising:
receiving a PUSCH transmitted by a user equipment (UE) with a number of repetitions, wherein the PUSCH is a PUSCH of Msg3 in a random access procedure,
wherein the receiving the PUSCH transmitted by the UE with the number of repetitions comprising: receiving the PUSCH of first transmission transmitted by the UE with a first number of repetitions,
wherein the method is preformed by the network device, and the UE includes a UE of a first type or a UE of a second type, wherein the network device determines that the UE is a UE of the first type or a UE of the second type,
the receiving the PUSCH of the first transmission transmitted by the UE with the first number of repetitions comprising:
for the UE of the first type, receiving the PUSCH of the first transmission for one time on the first initial time domain resources for the first transmission of the PUSCH indicated by the RAR; and
for the UE of the second type, continuously receiving, according to the repetition type of the PUSCH and the first initial time domain resources for the first transmission of the PUSCH indicated by the RAR, the PUSCH of the first transmission with the first number of repetitions, or receiving the PUSCH of the first transmission with the first number of repetitions through blind detections.

11. The method according to claim 10, wherein the receiving the PUSCH transmitted by the UE with the number of repetitions further comprising:
receiving the PUSCH of retransmission transmitted by the UE with a second number of repetitions.

12. The method according to claim 11,
wherein the receiving the PUSCH of the retransmission transmitted by the UE with the second number of repetitions comprising:
for the UE of the first type, receiving the PUSCH of the retransmission for one time on the second initial time domain resources for the retransmission of the PUSCH indicated by the predetermined format of the DCI; and
for the UE of the second type, continuously receiving, according to the repetition type of the PUSCH and the second initial time domain resources for the retransmission of the PUSCH indicated by the predetermined format of the DCI, the PUSCH of the retransmission with the second number of repetitions, or receiving the PUSCH of the retransmission with the second number of repetitions through the blind detections.

13. The method according to claim 11, wherein before the receiving the PUSCH transmitted by the UE with the number of repetitions, the method further comprising:
obtaining a repetition type of the PUSCH which is set in advance or transmitted by a network device via broadcast, and determining, based on the repetition type of the PUSCH, time domain resources for the transmission of the PUSCH;
wherein the receiving the PUSCH transmitted by the UE with the number of repetitions comprising:
receiving, according to the time domain resources of the PUSCH, the PUSCH transmitted by the UE with the number of repetitions.

14. The method according to claim 10, wherein before the receiving the PUSCH transmitted by the UE with the number of repetitions, the method further comprising:
obtaining a repetition type of the PUSCH which is set in advance or transmitted by a network device via broadcast, and determining, based on the repetition type of the PUSCH, time domain resources for the transmission of the PUSCH;
wherein the receiving the PUSCH transmitted by the UE with the number of repetitions comprising:
receiving, according to the time domain resources of the PUSCH, the PUSCH transmitted by the UE with the number of repetitions.

15. The method according to claim 14, wherein before the determining, based on the repetition type of the PUSCH, the time domain resources for the transmission of the PUSCH, the method further comprising:
determining first initial time domain resources for the first transmission of the PUSCH indicated by a RAR, or determining second initial time domain resources for the retransmission of the PUSCH indicated by a predetermined format of a DCI;
wherein the determining, based on the repetition type of the PUSCH, the time domain resources for the transmission of the PUSCH comprising:
determining, according to the repetition type of the PUSCH and the first initial time domain resources, the time domain resources for the first transmission of the PUSCH with the first number of repetitions; or,
determining, according to the repetition type of the PUSCH and the second initial time domain resources, the time domain resources for the retransmission of the PUSCH with the second number of repetitions;
wherein the receiving, according to the time domain resources of the PUSCH, the PUSCH transmitted by the UE with the number of repetitions comprising:
receiving, according to the time domain resources for the first transmission of the PUSCH with the first number of repetitions, the PUSCH of the first transmission transmitted by the UE with the first number of repetitions; or,
receiving, according to the time domain resources for the retransmission of the PUSCH with the second number of repetitions, the PUSCH of the retransmission transmitted by the UE with the second number of repetitions.

16. A user equipment, comprising a memory, a processor and computer programs which are stored on the memory and executable on the processor, wherein the programs, when executed by the processor, implement a method comprising:
determining a number of repetitions of a physical uplink shared channel (PUSCH), wherein the PUSCH is a PUSCH of Msg3 in a random access procedure and the number of repetitions is a positive integer; and
transmitting the PUSCH to a network device with the number of repetitions,
wherein the determining the number of repetitions of the PUSCH comprising: determining a first number of repetitions for first transmission of the PUSCH,
wherein the transmitting the PUSCH to the network device with the number of repetitions comprising:
transmitting the PUSCH of the first transmission to the network device with the first number of repetitions, wherein the determining the first number of repetitions for the first transmission of the PUSCH comprising: determining, based on first indication information in a predetermined indication field in a received random access response (RAR), the first number of repetitions for the first transmission of the PUSCH, wherein the predetermined indication field in the RAR comprising any one of: a modulation and coding scheme (MCS) indication field; a timing advance (TA) indication field; an idle bit field; or a newly added indication field for the number of repetitions, wherein when the predetermined indication field includes the MCS indication field, the first indication information is index information of the MCS; wherein the determining, based on the first indication information in the predetermined indication field in the RAR, the first number of repetitions for the first transmission of the PUSCH includes: determining, based on the index information of the MCS and a mapping relationship between the index information of the MCS and the number of repetitions, the first number of repetitions for the first transmission of the PUSCH; wherein the mapping relationship between the index information of the MCS and the number of repetitions is a mapping relationship which is defined in advance or received and indicated by the network device via broadcast;

wherein when the predetermined indication field includes the TA indication field, the first indication information is a TA value; wherein the determining, based on the first indication information in the predetermined indication field in the RAR, the first number of repetitions for the first transmission of the PUSCH includes: determining, based on the TA value and a mapping relationship between the TA value and the number of repetitions, the first number of repetitions for the first transmission of the PUSCH; wherein the mapping relationship between the TA value and the number of repetitions is a mapping relationship which is defined in advance or received and indicated by the network device via broadcast;

wherein when the predetermined indication field includes the idle bit field, the first indication information is indication information indicating whether the repetitions are enabled for the PUSCH of Msg3 or not; wherein the determining, based on the first indication information in the predetermined indication field in the RAR, the first number of repetitions for the first transmission of the PUSCH includes: determining, based on the indication information indicating whether the repetitions are enabled for the PUSCH of Msg3 or not, the first number of repetitions for the first transmission of the PUSCH; wherein if the idle bit field indicates that the repetitions are enabled for the PUSCH of Msg3, the first number of repetitions for the first transmission of the PUSCH is a number of repetitions which is defined in advance or received and indicated by the network device via broadcast; and if the idle bit field indicates that the repetitions are not enabled for the PUSCH of Msg3, the first number of repetitions for the first transmission of the PUSCH is 1;

when the predetermined indication field includes the newly added indication field for the number of repetitions, the first indication information is index information for indicating any one of a set of numeric values representing the number of repetitions; wherein the determining, based on the first indication information in the predetermined indication field in the RAR, the first number of repetitions for the first transmission of the PUSCH includes: determining, based on the index information for indicating any one of the set of numeric values representing the number of repetitions, the first number of repetitions for the first transmission of the PUSCH; wherein the set of numeric values representing the number of repetitions is a set of numeric values which is defined in advance or received and indicated by the network device via broadcast.

17. A network device, comprising a memory, a processor and computer programs which are stored on the memory and executable on the processor, wherein the programs, when executed by the processor, implement the method according to claim 10.

* * * * *